US011031800B2

(12) United States Patent
Kosugi et al.

(10) Patent No.: US 11,031,800 B2
(45) Date of Patent: Jun. 8, 2021

(54) DETERMINATION APPARATUS, SURVEILLANCE APPARATUS, SURVEILLANCE SYSTEM, DETERMINATION METHOD, SURVEILLANCE METHOD, AND NON-TRANSITORY STORAGE MEDIUM

(71) Applicant: NEC Corporation, Tokyo (JP)

(72) Inventors: Shinichiro Kosugi, Tokyo (JP); Hiroshi Hanafusa, Tokyo (JP); Hideki Tanabe, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 16/315,713

(22) PCT Filed: Apr. 25, 2017

(86) PCT No.: PCT/JP2017/016298
§ 371 (c)(1),
(2) Date: Jan. 7, 2019

(87) PCT Pub. No.: WO2018/012082
PCT Pub. Date: Jan. 18, 2018

(65) Prior Publication Data
US 2019/0157893 A1    May 23, 2019

(30) Foreign Application Priority Data
Jul. 15, 2016 (JP) .............................. JP2016-140566

(51) Int. Cl.
*H02J 7/00* (2006.01)
*H02J 13/00* (2006.01)
*G06K 9/00* (2006.01)

(52) U.S. Cl.
CPC ........ *H02J 7/0047* (2013.01); *G06K 9/00771* (2013.01); *H02J 7/00* (2013.01);
(Continued)

(58) Field of Classification Search
CPC .......................... Y02E 60/12; G01R 31/3648; G01R 31/3651; G01R 31/3624; H02J 7/0047
See application file for complete search history.

(56) References Cited

U.S. PATENT DOCUMENTS

2003/0110011 A1   6/2003  Kyotoku
2003/0209375 A1 * 11/2003 Suzuki ..................... H02J 11/00
                                                                        180/65.22
(Continued)

FOREIGN PATENT DOCUMENTS

JP    2001-306530 A    11/2001
JP    2004-102693 A     4/2004
(Continued)

OTHER PUBLICATIONS

International Search Report dated May 30, 2017, in corresponding PCT International Application.
(Continued)

*Primary Examiner* — Arun C Williams

(57) ABSTRACT

The present invention provides a determination apparatus (10) including: a target information obtaining unit (12) that obtains current position information of an energy storage system; a regular information obtaining unit (11) (position information obtaining unit) that obtains installation position associated with each energy storage system; and a determination unit (13) that determines whether or not the energy storage system is installed at the installation position on the basis of the current position information of the energy storage system.

41 Claims, 11 Drawing Sheets

(52) U.S. Cl.
CPC .......... *H02J 7/0021* (2013.01); *H02J 7/0045* (2013.01); *H02J 13/00* (2013.01); *H02J 7/0048* (2020.01); *Y02E 60/00* (2013.01); *Y04S 10/14* (2013.01)

(56) References Cited

U.S. PATENT DOCUMENTS

| | | | |
|---|---|---|---|
| 2004/0239502 A1* | 12/2004 | Yamauchi | H01M 10/48 340/568.1 |
| 2007/0188137 A1* | 8/2007 | Scheucher | B60L 58/27 320/116 |
| 2007/0285062 A1* | 12/2007 | Cherng | H02J 7/0031 320/136 |
| 2007/0290653 A1* | 12/2007 | Ibrahim | H02J 7/0063 320/107 |
| 2008/0281732 A1* | 11/2008 | Yamada | H01M 10/48 705/30 |
| 2009/0009176 A1* | 1/2009 | Nakao | G01R 31/396 324/432 |
| 2015/0123607 A1 | 5/2015 | Fujita et al. | |
| 2015/0372518 A1 | 12/2015 | Toya et al. | |

FOREIGN PATENT DOCUMENTS

| | | |
|---|---|---|
| JP | 2006-293993 A | 10/2006 |
| JP | 2010-212906 A | 9/2010 |
| JP | 2011-155714 A | 8/2011 |
| JP | 2011-248618 A | 12/2011 |
| JP | 2012-147398 A | 8/2012 |
| JP | 2013-074382 A | 4/2013 |
| JP | 2014-183334 A | 9/2014 |
| JP | 2014-204657 A | 10/2014 |
| JP | 2016-076801 A | 5/2016 |
| JP | 6274383 B1 | 1/2018 |
| JP | 6274383 | 2/2018 |
| WO | WO 2014/010295 A1 | 1/2014 |
| WO | WO 2015/115069 A1 | 8/2015 |

OTHER PUBLICATIONS

Decision to Grant a Patent of the counterpart Japanese Patent Application No. 2017-559474 dated Dec. 12, 2018.
Notification of Reasons for Refusal of the counterpart Japanese Patent Application No. 2018-001586 dated Sep. 18, 2018.
Notification of Reasons for Refusal of the counterpart Japanese Patent Application No. 2018-001586 dated Jan. 22, 2019.

* cited by examiner

DETERMINATION APPARATUS, SURVEILLANCE APPARATUS, SURVEILLANCE SYSTEM, DETERMINATION METHOD, SURVEILLANCE METHOD, AND NON-TRANSITORY STORAGE MEDIUM

CROSS-REFERENCE TO RELATED APPLICATIONS

This application is a National Stage Entry of International Application No. PCT/JP2017/016298, filed Apr. 25, 2017, which claims priority from Japanese Patent Application No. 2016-140566, filed Jul. 15, 2016. The entire contents of the above-referenced applications are expressly incorporated herein by reference.

TECHNICAL FIELD

The present invention relates to a determination apparatus, a surveillance apparatus, a surveillance system, a determination method, a surveillance method, and a program.

BACKGROUND ART

Patent Document 1 discloses a network system including a semiconductor exposure apparatus and a server. If remote access between the semiconductor exposure apparatus and the server is started, the semiconductor exposure apparatus transmits current position information to the server. The server detects unauthorized remote access by comparing and verifying the received current position information and an installation place from which the remote access is permitted.

Patent Document 2 discloses a group electric power management apparatus which obtains information of a power storage amount for each of plural power storage apparatuses from plural controllers provided for each of the power storage apparatuses and manages the information of the power storage amount for each of groups.

Patent Document 3 discloses a technology related to a power storage apparatus. The power storage apparatus transmits log information indicating history of an installation position or an operation status of the power storage apparatus to an external apparatus at a predetermined timing. The predetermined timing is exemplified as "every time a predetermined period such as 1 hour, 1 day, 1 week, 1 month, or the like elapses", "every time an operation mode (power-storing state, discharging state, stopping state, or the like) of the power storage apparatus changes", "a case where an unexpected incident (unexpected change of position information, battery failure, or the like) occurs", and the like.

RELATED DOCUMENT

Patent Document

[Patent Document 1] Japanese Patent Application Publication No. 2001-306530
[Patent Document 2] Japanese Patent Application Publication No. 2011-155714
[Patent Document 3] Japanese Patent Application Publication No. 2011-248618

SUMMARY OF THE INVENTION

Technical Problem

An energy storage system which stores energy such as electric power is installed at a predetermined position and used. In the technology of Patent Document 3, the log information related to the operation mode of the power storage apparatus is recorded, but there is a problem that it is not possible to determine whether or not the power storage apparatus is installed at a regular position. The technology of Patent Document 1 is not a technology related to an energy storage system. The technology of Patent Document 2 does not provide a means for determining whether or not the power storage apparatus is installed at the regular position.

Solution to Problem

According to the present invention, there is provided a determination apparatus including: a target information obtaining unit that obtains current position information of an energy storage system; a position information obtaining unit that obtains installation position associated with each energy storage system; and a determination unit that determines whether or not the energy storage system is installed at the installation position on the basis of the current position information of the energy storage system.

In addition, according to the present invention, there is provided a surveillance apparatus including: a transmission determination unit that determines to transmit current position information of an energy storage system to an external apparatus on the basis of a predetermined condition; and a communication unit that transmits the current position information of the energy storage system to the external apparatus according to determination of the transmission determination unit.

In addition, according to the present invention, there is provided a surveillance system including the determination apparatus and the surveillance apparatus.

In addition, according to the present invention, there is provided a determination method executed by a computer, the method including: a target information obtaining step of obtaining current position information of an energy storage system; a position information obtaining step of obtaining installation position associated with each energy storage system; and a determination step of determining whether or not the energy storage system is installed at the installation position on the basis of the current position information of the energy storage system.

In addition, according to the present invention, there is provided a program causing a computer to function as: a target information obtaining unit that obtains current position information of an energy storage system; a position information obtaining unit that obtains installation position associated with each energy storage system; and a determination unit that determines whether or not the energy storage system is installed at the installation position on the basis of the current position information of the energy storage system.

In addition, according to the present invention, there is provided a surveillance method executed by a computer, the method including: a transmission determination step of determining to transmit current position information of an energy storage system to an external apparatus on the basis of a predetermined condition; and a communication step of transmitting the current position information of the energy storage system to the external apparatus according to determination of the transmission determination unit.

In addition, according to the present invention, there is provided a program causing a computer to function as: a transmission determination unit that determines to transmit current position information of an energy storage system to an external apparatus on the basis of a predetermined condition; and a communication unit that transmits the current position information of the energy storage system to the external apparatus according to determination of the transmission determination unit.

Advantageous Effects of Invention

According to the present invention, it is possible to determine whether or not an energy storage system is installed at a regular position.

BRIEF DESCRIPTION OF THE DRAWINGS

The above objects and other objects, features and advantages will become more apparent from the following description of the preferred example embodiments and the accompanying drawings.

DESCRIPTION OF EMBODIMENTS

First, examples of hardware configurations of apparatuses (determination apparatus, surveillance apparatus, and energy storage system) of the present example embodiment will be described. Each of units included in the apparatus of the present example embodiment can be configured with any combination of hardware and software on the basis of a central processing unit (CPU) of a predetermined computer, a memory, a program loaded in the memory, a storage unit storing the program (in addition to the program stored from a stage of shipping the apparatus in advance, a program downloaded from a storage medium such as a compact disc (CD) or a server on the internet) such as a hard disc, and a network connection interface. Those skilled in the art understand that there are various modifications to a configuration method thereof and the apparatus.

Figure 1:
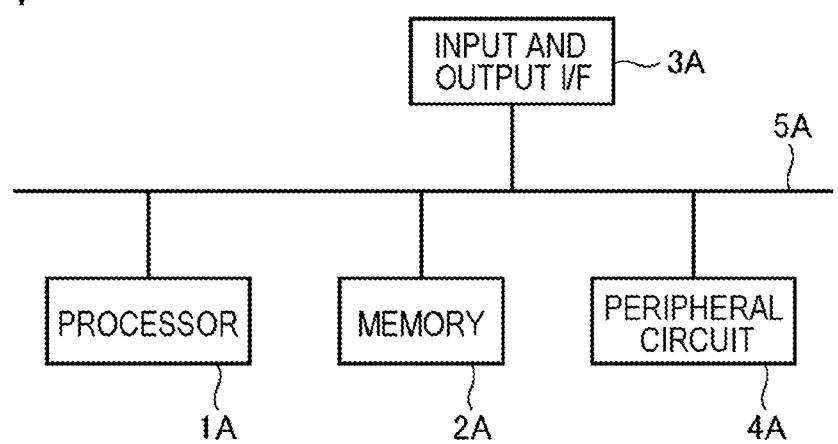
FIG. 1 is a diagram conceptually illustrating an example of a hardware configuration of an apparatus according to the present example embodiment.

FIG. 1 is a block diagram illustrating a hardware configuration of the apparatus of the present example embodiment. As illustrated in FIG. 1, the apparatus includes a processor 1A, a memory 2A, an input and output interface 3A, a peripheral circuit 4A, and a bus 5A. The peripheral circuit 4A includes various modules. Note that, the apparatus may not include the peripheral circuit 4A.

The bus 5A is a data transmission path through which the processor 1A, the memory 2A, the peripheral circuit 4A and, the input and output interface 3A transmit and receive data from one another. The processor 1A is an arithmetic processing device such as a central processing unit (CPU) or a graphics processing unit (GPU). The memory 2A is a memory such as a random access memory (RAM) or a read only memory (ROM), for example. The input and output interface 3A includes an interface for obtaining information from an input device (for example, keyboard, mouse, microphone, or the like), an external apparatus, an external server, an external sensor, and the like and an interface for outputting the information to an output device (for example, display, speaker, printer, mailer, or the like), the external apparatus, the external server, and the like. The processor 1A can issue a command to each of the modules and perform a calculation on the basis of the calculation results thereof.

Hereinafter, the present example embodiment will be described. Note that, the functional block diagram used in the description of the example embodiment below is not a hardware unit configuration but a block of a functional unit. In these drawings, it is described that each of apparatuses is configured with one apparatus, but its configuration means is not limited to thereto. That is, the apparatus may have a physically separated configuration or a logically divided configuration. Note that, the same components are denoted by the same reference numerals, and description thereof will not be repeated as appropriate.

Note that, in the present specification, "obtaining" means at least one of that an apparatus receives data or information stored in another apparatus or a storage medium (active obtaining), for example, that the apparatus receives data or information by requesting or inquiring the other apparatus, the apparatus reads data or information by accessing to the other apparatus or the storage medium, or data or information output from the other is input to the apparatus (passive obtaining), and for example, the apparatus receives distributed (or transmitted, push-notified, or the like) data or information. In addition, "obtaining" also includes selecting and obtaining from the received data or information, or selecting and receiving the distributed data or information.

First Example Embodiment

A unit for verifying whether or not the energy storage system is installed at a regular position without going to the place is desired. The reasons are exemplified as follows.

(Reason 1)

A value of the energy storage system is changed depending on a use environment. For example, the energy storage system used in a harsh environment (for example, high temperature, high humidity, or the like) where probability of failure occurrence is high has a decreased value.

A finance company which makes financing using the energy storage system as collateral or makes financing for business using the energy storage system needs to calculate a value of the energy storage system in consideration of not only the configuration (manufacturer, date of manufacture, model number, or the like) or the duration of use of the energy storage system but also the installation position in the future and to make an appropriate amount of financing.

For this reason, when making financing, a side receiving the loan is considered to be required to declare the installation position of the energy storage system and comply with the installation position. In this case, the finance company desires to easily verify whether or not the energy storage system is installed at the regular position (declared position) after the financing.

(Reason 2)

The energy storage system is often installed outdoors or in an inconspicuous place. For this reason, it is vulnerable to theft. This problem can prevent a consumer from purchasing and using the energy storage systems. Therefore, a means to solve the problem is desired.

For example, if it can be detected that a stolen energy storage system is being used elsewhere, the energy storage system can be discovered and recovered. A technology of verifying whether or not the energy storage system is installed at a regular position (installation position registered by a regular consumer) can perform the detection.

Figure 2:
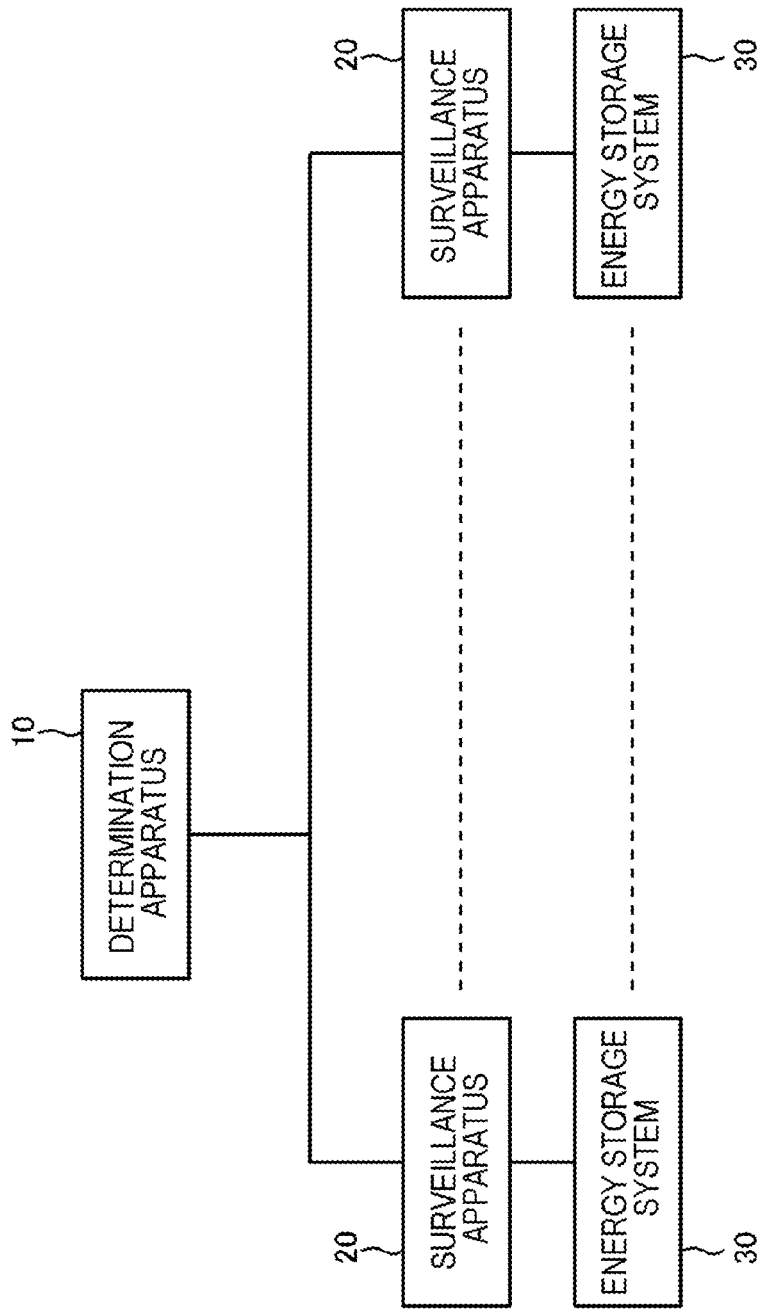
FIG. 2 is an example of a functional block diagram illustrating an overview of a surveillance system according to the present example embodiment.

Hereinafter, a surveillance system of the present example embodiment will be described. First, with reference to FIG. 2, an overview of the surveillance system according to the present example embodiment will be described. As illustrated, the surveillance system includes a determination apparatus 10, plural surveillance apparatuses 20, and plural energy storage systems 30.

The energy storage system 30 is a system for storing and outputting energy such as electric power and corresponds to, for example, a power storage system. The energy storage system 30 is installed in, for example, an area of a consumer.

The surveillance apparatus 20 is installed corresponding to each of the energy storage systems 30 and surveils an operation and a state of the corresponding energy storage system 30. The surveillance apparatus 20 is installed in, for example, the area of the consumer.

The corresponding surveillance apparatus 20 and the energy storage system 30 transmit and receive data from each other with a certain means (communication means). Note that, the surveillance apparatus 20 and the energy storage system 30 may be integrated physically and/or logically or may be configured separately.

The determination apparatus 10 receives information on the corresponding energy storage system 30 from each of the plural surveillance apparatuses 20. Then, the determination apparatus 10 determines whether or not each of the energy storage systems 30 is installed at the regular installation position on the basis of the received information.

The determination apparatus 10 may control an operation of the energy storage system 30. That is, on the basis of a current position of the energy storage system 30, the determination apparatus 10 may determine whether or not to permit the operation of the energy storage system 30 and may notify a determination result. In this case, in a case of receiving permission to operate from the determination apparatus 10, the energy storage system 30 can operate and in a case of not receiving the permission to operate, the energy storage system 30 cannot operate.

The determination apparatus 10 may be, for example, a cloud server. Each of the determination apparatuses 10 and the plural surveillance apparatuses 20 transmit and receive data with each other through a communication network such as the internet. Note that, each of the plural energy storage systems 30 may also be connected to the communication network such as the internet.

Hereinafter, detailed configurations of the energy storage system 30, the surveillance apparatus 20, and the determination apparatus 10 will be described in this order.

The energy storage system 30 is a system (for example, power storage system) for storing energy such as electric power. The energy storage system 30 may include a unit for storing identification information for identifying the own system.

The identification information for identifying the own system may be, for example, information (name, address, telephone number, date of birth, and the like of consumer) for identifying a consumer who manages the own system. In such a case, the energy storage system 30 may further include a unit for receiving an input of the identification information and a unit for registering the received identification information in a storage device of the own system.

In addition, the identification information for identifying the own system may be unique identification information attached to each of the energy storage systems 30 by a manufacturer. The identification information includes, for example, a combination of numbers, letters, and the like. For example, the identification information may be registered in the storage device of the energy storage system 30 from a shipping stage of the energy storage system 30.

In addition, the energy storage system 30 may include a unit for receiving an input of the installation position (regular installation position) of the own system and a unit for registering the received installation position in the storage device of the own system. The installation position of the energy storage system 30 can be registered by latitude and longitude, an address, or the like.

Note that, the energy storage system 30 may not receive a change of the registered identification information or details of the installation position by other than an authenticated user having legitimate authority. For example, the energy storage system 30 can authenticate the user having legitimate authority by using any authentication means such as password authentication, biometric authentication, or the like.

The energy storage system 30 includes a unit which transmits the information (identification information, installation position, or the like) to the corresponding surveillance apparatus 20. Hereinafter, in some cases, the information stored in the energy storage system 30 is referred to as "various registration information"

The energy storage system 30 may transmit the various registration information to the surveillance apparatus 20 in response to a request from the surveillance apparatus 20.

In addition, the energy storage system 30 may surveil a timing at which the various registration information is transmitted to the surveillance apparatus 20 by the own system. The energy storage system 30 may transmit the various registration information to the surveillance apparatus 20 according to detection of the timing.

The timing of transmitting is exemplified as "timing when a power switch of the energy storage system 30 is turned ON", "timing when an instruction input for operating the energy storage system 30 is received in a state in which operation permission is not received from the determination apparatus 10", "timing when an instruction input for operating the energy storage system 30 is received regardless of whether or not the operation permission is received", "timing when a predetermined date and time (for example, 0 o'clock on 1st every month) arrives in a state where the operation permission is received from the determination apparatus 10", and the like, but the timing is not limited thereto. Another variation will be described in the following example embodiment.

Here, an example of the energy storage system 30 will be described with reference to FIG. 3. As illustrated, the energy storage system 30 includes a system controller 31, a power conditioning system (PCS) 32, an energy control unit 33, and an energy storage unit 34. In the drawing, a communication line is indicated by a solid line and an electric power line is indicated by a dotted line.

The system controller 31 controls the overall energy storage system 30. The PCS 32 performs conversion of DC power/AC power. The energy storage unit 34 stores energy (for example, electric power). The energy storage unit 34 may include, for example, a cell stack which stores energy, a battery monitor which monitors a cell temperature, a voltage, and the like. The energy control unit 33 controls the energy storage unit 34. The energy control unit 33 is a so-called battery management unit (BMU), a battery management system (BMS), or the like.

For example, the system controller 31 may include a unit which stores the identification information for identifying the own system, a unit which receives the input of the installation position of the own system, a unit which registers the received installation position in the storage device of the own system, a unit which transmits the various registration information to the corresponding surveillance apparatus 20, and the like.

Figure 4:
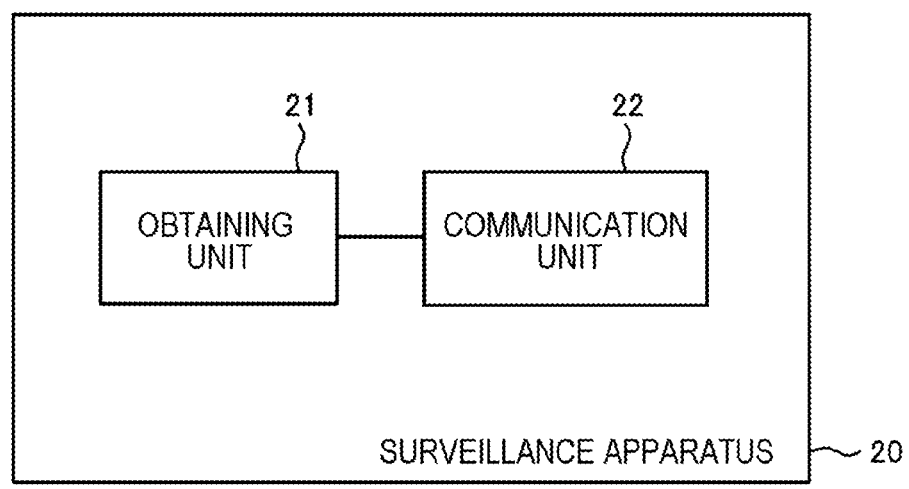
FIG. 4 is an example of a functional block diagram illustrating a surveillance apparatus according to the present example embodiment.

Next, the surveillance apparatus 20 will be described. FIG. 4 is an example of a functional block diagram of the surveillance apparatus 20. As illustrated, the surveillance apparatus 20 includes an obtaining unit 21 and a communication unit 22.

The obtaining unit 21 obtains the various registration information from the corresponding energy storage system 30. For example, the obtaining unit 21 may obtain, from the corresponding energy storage system 30, the identification information for identifying the energy storage system 30. In addition, the obtaining unit 21 may obtain, from the corresponding energy storage system 30, the installation position registered in the energy storage system 30.

The obtaining unit 21 may obtain the various registration information spontaneously transmitted from the corresponding energy storage system 30.

In addition, the obtaining unit 21 may request the various registration information to the corresponding energy storage system 30 and obtain the various registration information returned in response to the request. The obtaining unit 21 may transmit the request for the various registration information to the corresponding energy storage system 30 in response to the request from the determination apparatus 10. In addition, the obtaining unit 21 may surveil the timing of transmitting the request for the various registration information to the energy storage system 30 and transmit the request of the various registration information to the energy storage system 30 according to detection of the timing.

The timing of transmitting the request of the various registration information is exemplified as "timing when a power switch of the energy storage system 30 is turned ON", "timing when an instruction input for operating the energy storage system 30 is received in a state in which operation permission is not received from the determination apparatus 10", "timing when an instruction input for operating the energy storage system 30 is received regardless of whether or not the operation permission is received", "timing when a predetermined date and time (for example, 0 o'clock on 1st every month) arrives in a state where the operation permission is received from the determination apparatus 10", and the like, but the timing is not limited thereto. Another variation will be described in the following example embodiment.

The obtaining unit 21 can receive information (information or the like indicating input contents made by operating the energy storage system 30) for detecting the timing from the energy storage system 30 and detect the timing on the basis of the information.

In addition, the obtaining unit 21 obtains current position information of the corresponding energy storage system 30. At least one of the surveillance apparatus 20 and the energy storage system 30 includes a position information obtaining unit which obtains the current position information. The obtaining unit 21 obtains the current position information obtained by the position information obtaining unit as the current position information of the corresponding energy storage system 30. In a case where the surveillance apparatus 20 is installed close to the energy storage system 30 or a case where the surveillance apparatus 20 and the energy storage system 30 are physically integrated, the current position information obtained by the surveillance apparatus 20 can be handled as the current position information of the energy storage system 30.

The means for obtaining the current position information is not particularly limited. A global positioning system (GPS) may be used or the current position of the surveillance apparatus 20 or the energy storage system 30 may be determined on the basis of an internet protocol (IP) address, a wireless local area network (LAN) access point, or the like.

The communication unit 22 transmits the information obtained by the obtaining unit 21 to the determination apparatus 10. For example, the communication unit 22 transmits the current position information of the corresponding energy storage system 30 obtained by the obtaining unit 21 to the determination apparatus 10. In addition, the communication unit 22 may transmits the various registration information (identification information or installation position) of the energy storage system 30 obtained by the obtaining unit 21 to the determination apparatus 10.

Figure 5:
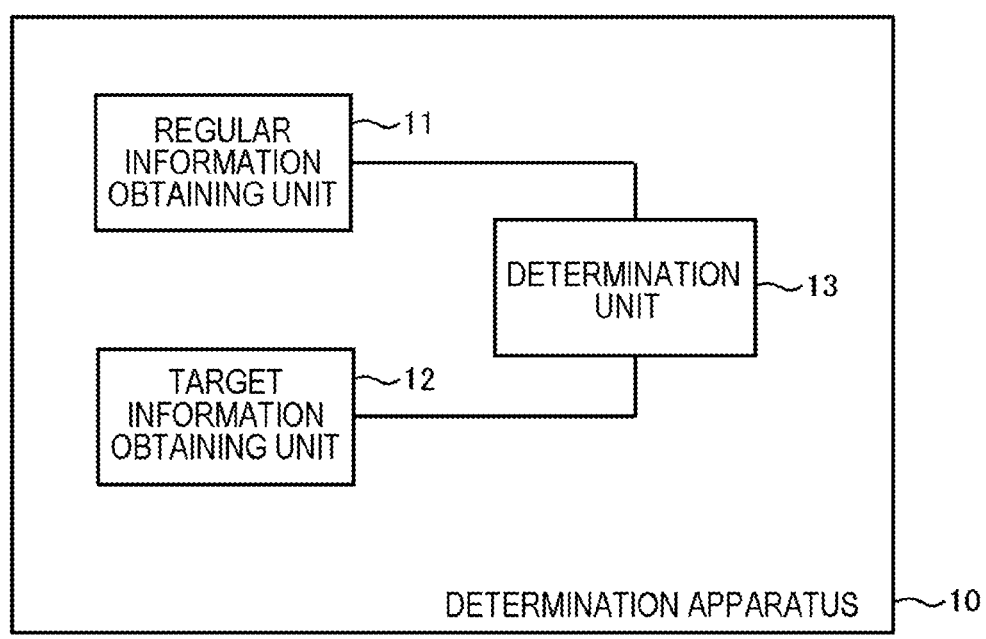
FIG. 5 is an example of a functional block diagram illustrating a determination apparatus according to the present example embodiment.

Next, the determination apparatus 10 will be described. FIG. 5 illustrates an example of a functional block diagram of the determination apparatus 10. As illustrated, the determination apparatus 10 includes a regular information obtaining unit (position information obtaining unit) 11, a target information obtaining unit 12, and a determination unit 13.

The target information obtaining unit 12 obtains the current position information of the energy storage system 30. The target information obtaining unit 12 obtains the current position information transmitted by the surveillance apparatus 20.

The regular information obtaining unit 11 obtains the installation position (regular installation position) associated with each of the energy storage systems 30. The regular information obtaining unit 11 can obtain (1) "the regular installation position determined for each of the energy storage systems 30" stored in advance in a database or the like, (2) "the regular installation position defined to satisfy a safety standard for each of products of the energy storage system 30 by a manufacturer (system integrator)" stored in advance in the database or the like, (3) "the regular installation position of the energy storage system 30 which is tested on whether satisfying the safety standard by a certification authority or the like and therefore verified and authenticated as complying with an international safety standard" stored in advance in the database or the like, and (4) "the regular installation position of which the energy storage system 30 is verified to satisfy the international safety standard or another safety standard at the certification authority or the like" stored in advance in the database or the like.

For example, the regular information obtaining unit 11 may obtain the regular installation position of the energy storage system 30 from at least one of "the regular information storage unit which stores the regular installation position associated with each of the plural energy storage systems 30 (associated with the identification information of each of the plural energy storage systems 30)" and "the energy storage systems 30". Note that, the determination apparatus 10 may include the regular information storage unit and the external apparatus configured to be capable of communicating with the determination apparatus 10 may include the regular information storage unit.

In a case of obtaining the regular installation position from the regular information storage unit, the regular information obtaining unit 11 obtains the identification information of the energy storage system 30 (some pieces of the various registration information) transmitted from the surveillance apparatus 20. The regular information storage unit is searched with the identification information as a key and the regular installation position corresponding to the key is obtained.

In a case of obtaining the regular installation position from the energy storage system 30, the regular information obtaining unit 11 obtains the installation position of the energy storage system 30 (some pieces of the various registration information) transmitted from the surveillance apparatus 20.

The regular information obtaining unit 11 and the target information obtaining unit 12 may obtain the various information (current position information, various registration information, and the like) spontaneously transmitted from the surveillance apparatus 20.

In addition, the determination apparatus 10 may further include a request unit which requests the various information to the surveillance apparatus 20. The target information obtaining unit 12 may obtain the various information returned from the surveillance apparatus 20 in response to the request. The request unit may surveil the timing of transmitting the request of the various information to the surveillance apparatus 20 and transmit the request of the various information to the surveillance apparatus 20 according to detection of the timing.

The timing of transmitting the request of the various information is exemplified as "timing when a power switch of the energy storage system 30 is turned ON", "timing when an instruction input for operating the energy storage system 30 is received in a state in which operation permission is not received from the determination apparatus 10", "timing when an instruction input for operating the energy storage system 30 is received regardless of whether or not the operation permission is received", "timing when a predetermined date and time (for example, 0 o'clock on 1st every month) arrives in a state where the operation permission is received from the determination apparatus 10", and the like, but the timing is not limited thereto. Another variation will be described in the following example embodiment.

The request unit may receive information (information or the like indicating input contents made by operating the energy storage system 30) for detecting the timing from the energy storage system 30 through the surveillance apparatus 20 and detect the timing on the basis of the information.

The determination unit 13 determines whether or not the energy storage system 30 is installed at the regular installation position on the basis of the current position information of the energy storage system 30.

For example, the determination unit 13 performs the determination on the basis of the current position information of the energy storage system 30 and the regular installation position obtained from the regular information storage unit. In a case where the current position information of the energy storage system 30 and the regular installation position obtained from the regular information storage unit coincide with each other, the determination unit 13 can determine that the energy storage system 30 is installed at the regular installation position. Here, the coincidence may be an exact match, and furthermore, the coincidence may include a relationships (for example, a case where one is indicated with a wide range with ○○ town and the other is indicated with a narrower range by latitude and longitude or the like is assumed) in which one includes the other.

In addition, the determination unit 13 performs the determination on the basis of the current position information of the energy storage system 30 and the regular installation position obtained from the energy storage system 30. In a case where the current position information of the energy storage system 30 and the regular installation position obtained from the energy storage system 30 coincide with each other, the determination unit 13 can determine that the energy storage system 30 is installed at the regular installation position. Here, the coincidence may be an exact match, and further more, the coincidence may include a relationships (for example, a case where one is indicated with a wide range with ○○ town and the other is indicated with a narrower range by latitude and longitude or the like is assumed) in which one includes the other.

In addition, the determination unit 13 may perform the determination on the basis of the current position information of the energy storage system 30, the regular installation position obtained from the regular information storage unit, and the regular installation position obtained from the energy storage system 30. In a case where the current position information of the energy storage system 30, the regular installation position obtained from the regular information storage unit, and the regular installation position obtained from the energy storage system 30 coincide with one another, the determination unit 13 can determine that the energy storage system 30 is installed at the regular installation position. Here, the coincidence may be an exact match, and furthermore, the coincidence may include a relationships (for example, a case where one is indicated with a wide range with ○○ town and the other is indicated with a narrower range by latitude and longitude or the like is assumed) in which one includes the other.

Note that, the determination unit 13 may determine whether or not to permit the operation of the energy storage system 30 on the basis of the determination result (whether or not to be installed at the regular installation position). In a case of being installed at the regular installation position, the determination unit 13 permits the operation and in a case of not being installed at the regular installation position, the determination unit 13 does not permit the operation.

The determination apparatus 10 may transmit the determination result of the determination unit 13 to the surveillance apparatus 20 and the energy storage system 30. In this case, in a case of receiving permission to operate from the determination apparatus 10, the energy storage system 30 can operate and in a case of not receiving the permission to operate, the energy storage system 30 cannot operate. For example, the component (for example, the system controller 31 in FIG. 3) which controls the overall energy storage system 30 controls the operation of the energy storage system 30 on the basis of contents (whether or not to permit the operation) notified from the determination apparatus 10.

In addition, the determination apparatus 10 may register an e-mail address of a notification destination for each of the plural energy storage systems 30 and notify the notification destination of the determination result.

Next, an example of a flow of a process of the surveillance system according to the present example embodiment will be described with reference to a sequence diagram in FIG. 6.

[Process Example in Case Where Operation is Not Permitted]

As preparation, the determination apparatus 10 registers the regular installation position for each of the energy storage systems 30 (S10). For example, the operator of the determination apparatus 10 receives the notification of the identification information of the energy storage system 30 (as described above) and the regular installation position from a person concerned (owner, manager, finance company, or the like) of the energy storage system 30. The operator of the determination apparatus 10 registers the received contents in the regular information storage unit of the determination apparatus 10.

In addition, as preparation before the operation, each of the plural energy storage systems 30 registers the various registration information in the energy storage system 30 (S11). For example, the person concerned of the energy storage system 30 inputs the regular installation position or the identification information to the energy storage system 30 and registers the regular installation position or the identification information.

At a predetermined timing after this, the energy storage system 30 transmits the regular installation position and the identification information of the own system to the corresponding surveillance apparatus 20 (S12). For example, the energy storage system 30 transmits the various registration information to the surveillance apparatus 20 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing.

In addition, the surveillance apparatus 20 obtains the current position information of the corresponding energy storage system 30 at a predetermined timing (S13). The surveillance apparatus 20 may obtain the current position information from the position information obtaining unit included in the own apparatus or may obtain the current position information from the position information obtaining unit included in the corresponding energy storage system 30. For example, the surveillance apparatus 20 obtains the current position information of the energy storage system 30 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing. In a case of obtaining the current position information from the position information obtaining unit included in the energy storage system 30, it is possible to transmit the regular installation position, the identification information, and the current position to the corresponding surveillance apparatus 20. These pieces of information may be transmitted at one time or separately.

Note that, orders of S12 and S13 are not limited to those illustrated.

After then, the surveillance apparatus 20 transmits the regular installation position of the energy storage system 30 (some pieces of the various registration information), the identification information of the energy storage system 30 (some pieces of the various registration information), and the current position information of the energy storage system 30 to the determination apparatus 10 (S14). These pieces of information may be transmitted at one time or separately. In a case where the operation permission is not received, these pieces of information are transmitted to the determination apparatus 10 together with the application for the operation permission.

After then, the determination apparatus 10 searches the regular information storage unit with the identification information of the energy storage system 30 as a key and obtains the corresponding regular installation position (S15).

The determination apparatus 10 determines whether or not the energy storage system 30 is installed at the regular installation position on the basis of the current position information of the energy storage system 30, the regular installation position obtained from the regular information storage unit, and the regular installation position obtained from the energy storage system 30 (S16). In a case where the current position information of the energy storage system 30, the regular installation position obtained from the regular information storage unit, and the regular installation position obtained from the energy storage system 30 coincide with one another, the determination apparatus 10 can determine that the energy storage system 30 is installed at the regular installation position. Here, the coincidence may be an exact match, and furthermore, the coincidence may include a relationships (for example, a case where one is indicated with a wide range with ∘∘ town and the other is indicated with a narrower range by latitude and longitude or the like is assumed) in which one includes the other.

Further, the determination apparatus 10 may determine whether or not to permit the operation on the basis of the determination result (whether or not being installed at the regular installation position). In a case of being installed at the regular installation position, the determination apparatus 10 permits the operation and in a case of not being installed at the regular position, the determination apparatus 10 does not permit the operation.

After then, the determination apparatus 10 responds to the surveillance apparatus 20 with the determination result (S17). The surveillance apparatus 20 responds to the energy storage system 30 with the determination result (S18). Note that, the response may include whether or not to permit the operation.

The energy storage system 30 controls the own system on the basis of the notified contents. That is, in a case where the response that the operation is permitted is received, the energy storage system 30 enters into an operable state. In contrast, in a case where the response that the operation is not permitted is received, the energy storage system 30 enters into an inoperable state. In this case, the energy storage system 30 may notify that the operation is not permitted to the user. A notification means is implemented by using the output apparatus such as the display, the speaker, the mailer, the printer, and the like.

[Process Example in Case Where Operation is Permitted]

Figure 6:
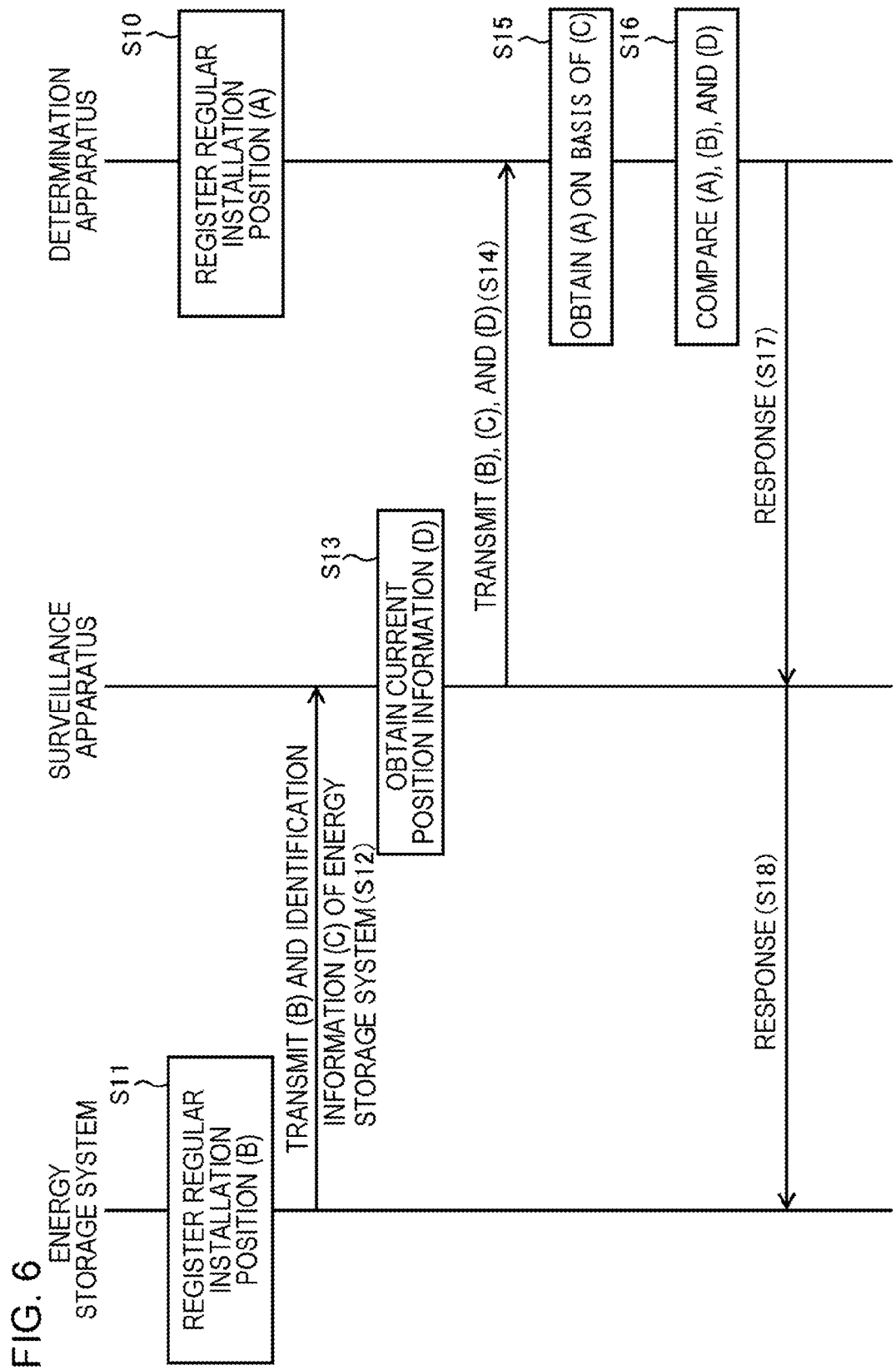
FIG. 6 is a sequence diagram illustrating an example of a flow of a process of the surveillance system according to the present example embodiment.

In the case where the operation is permitted, S12 to S18 of FIG. 6 are repeated. That is, the energy storage system 30 transmits the various registration information to the corresponding surveillance apparatus 20 at a predetermined timing (S12). In addition, the surveillance apparatus 20 obtains the current position information of the energy storage system 30 at a predetermined timing (S13). For example, "timing when a predetermined date and time (for example, 0 o'clock on 1st every month) arrives", "timing when a power switch of the energy storage system 30 is turned ON", or the like is exemplified, but the timing is not limited thereto. Another variation will be described in the following example embodiment. The energy storage system 30 may detect the timing, the surveillance apparatus 20 may detect the timing, or the determination apparatus 10 may detect the timing.

Thereafter, the same process as described in "the process example in the case where the operation is not permitted" is repeated. Note that, in a case where the response that the operation is permitted is received (S18), the energy storage system 30 continues to operate as it is. In contrast, in a case where the response that the operation is not permitted is received (S18), the energy storage system 30 stops operating. In this case, the energy storage system 30 may notify that the operation is not permitted to the user.

Next, another example of a flow of a process of the surveillance system according to the present example embodiment will be described with reference to a sequence diagram in FIG. 7.

[Process Example in Case Where Operation is Not Permitted]

As preparation, the determination apparatus 10 registers the regular installation position for each of the energy storage systems 30 (S20). For example, the operator of the determination apparatus 10 receives the notification of the identification information of the energy storage system 30 (as described above) and the regular installation position from the person concerned (owner, manager, finance company, or the like) of the energy storage system 30. The operator of the determination apparatus 10 registers the received contents in the regular information storage unit of the determination apparatus 10.

At a predetermined timing after this, the energy storage system 30 transmits the identification information of the own system to the corresponding surveillance apparatus 20 (S21). For example, the energy storage system 30 transmits the identification information of the own system to the surveillance apparatus 20 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing.

In addition, the surveillance apparatus 20 obtains the current position information of the corresponding energy storage system 30 at a predetermined timing (S22). The surveillance apparatus 20 may obtain the current position information from the position information obtaining unit included in the own apparatus or may obtain the current position information from the position information obtaining unit included in the corresponding energy storage system 30. For example, the surveillance apparatus 20 obtains the current position information of the energy storage system 30 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing. In a case of obtaining the current position information from the position information obtaining unit included in the energy storage system 30, it is possible to transmit the regular installation position, the identification information, and the current position to the corresponding surveillance apparatus 20. These pieces of information may be transmitted at one time or separately.

Note that, orders of S21 and S22 are not limited to those illustrated.

After then, the surveillance apparatus 20 transmits the identification information of the energy storage system 30 and the current position information of the energy storage system 30 to the determination apparatus 10 (S23). These pieces of information may be transmitted at one time or separately. In a case where the operation permission is not received, these pieces of information are transmitted to the determination apparatus 10 together with the application for the operation permission.

After then, the determination apparatus 10 searches the regular information storage unit with the identification information of the energy storage system 30 as a key and obtains the corresponding regular installation position (S24).

The determination apparatus 10 determines whether or not the energy storage system 30 is installed at the regular installation position on the basis of the current position information of the energy storage system 30 and the regular installation position obtained from the regular information storage unit (S25). In a case where the current position information of the energy storage system 30 and the regular installation position obtained from the regular information storage unit coincide with each other, the determination apparatus 10 can deter mine that the energy storage system 30 is installed at the regular installation position. Here, the coincidence may be an exact match, and furthermore, the coincidence may include a relationships (for example, a case where one is indicated with a wide range with ○○ town and the other is indicated with a narrower range by latitude and longitude or the like is assumed) in which one includes the other.

Further, the determination apparatus 10 may determine whether or not to permit the operation on the basis of the determination result (whether or not being installed at the regular installation position). In a case of being installed at the regular installation position, the determination apparatus 10 permits the operation and in a case of not being installed at the regular installation position, the determination apparatus 10 does not permit the operation.

After then, the determination apparatus 10 responds to the surveillance apparatus 20 with the determination result (S26). The surveillance apparatus 20 responds the energy storage system 30 with the determination result (S27). Note that, the response may include whether or not to permit the operation.

The energy storage system 30 controls the own system on the basis of the notified contents. That is, in a case where the response that the operation is permitted is received, the energy storage system 30 enters into the operable state. On the other hand, in a case where the response that the operation is not permitted is received, the energy storage system 30 enters into the inoperable state. In this case, the energy storage system 30 may notify that the operation is not permitted to the user. The notification unit is realized by using the output device such as the display, the speaker, the mailer, the printer, and the like.

[Process Example in Case Where Operation is Permitted]

Figure 7:
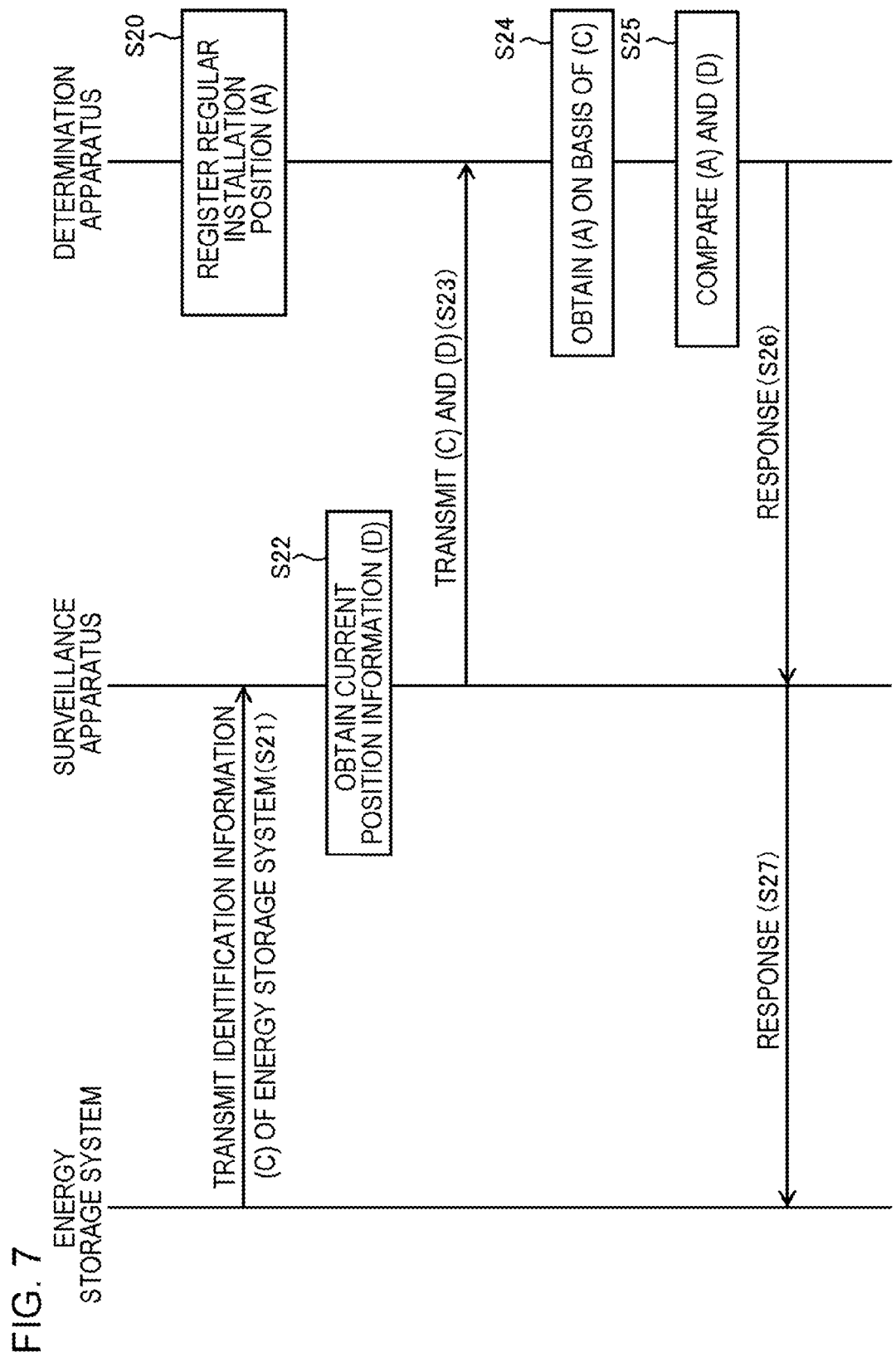
FIG. 7 is a sequence diagram illustrating another example of a flow of a process of the surveillance system according to the present example embodiment.

In the case where the operation is permitted, S21 to S27 of FIG. 7 are repeated. That is, the energy storage system 30 transmits the identification information of the own system to the corresponding surveillance apparatus 20 at the predetermined timing (S21). In addition, the surveillance apparatus 20 obtains the current position information of the energy storage system 30 at the predetermined timing (S22). For example, "timing when a predetermined date and time (for example, 0 o'clock on 1st every month) arrives", "timing when a power switch of the energy storage system 30 is turned ON", or the like is exemplified, but the timing is not limited thereto. Another variation will be described in the following example embodiment. The energy storage system 30 may detect the timing, the surveillance apparatus 20 may detect the timing, or the determination apparatus 10 may detect the timing.

Thereafter, the same process as described in "the process example in the case where the operation is not permitted" is repeated. Note that, in a case where the response that the operation is permitted is received (S27), the energy storage system 30 continues to operate as it is. On the other hand, in a case where the response that the operation is not permitted is received (S27), the energy storage system 30 stops operating. In this case, the energy storage system 30 may notify that the operation is not permitted to the user.

Next, an example of a flow of a process of the surveillance system according to the present example embodiment will be described with reference to a sequence diagram in FIG. 8.

[Process Example in Case Where Operation is Not Permitted]

As preparation before the operation, each of the plural energy storage systems 30 registers the various registration information in the energy storage system 30 (S30). For example, the person concerned of the energy storage system 30 inputs the regular installation position or the identification information to the energy storage system 30 and registers the regular installation position or the identification information.

At a predetermined timing after this, the energy storage system 30 transmits the regular installation position and the identification information of the own system to the corresponding surveillance apparatus 20 (S31). For example, the energy storage system 30 transmits the various registration information to the surveillance apparatus 20 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing.

In addition, the surveillance apparatus 20 obtains the current position information of the corresponding energy storage system 30 at a predetermined timing (S32). The surveillance apparatus 20 may obtain the current position information from the position information obtaining unit included in the own apparatus or may obtain the current position information from the position information obtaining unit included in the corresponding energy storage system 30. For example, the surveillance apparatus 20 obtains the current position information of the energy storage system 30 at a "timing when a power switch of the energy storage system 30 is turned ON", "timing when an instruction input for operating the energy storage system 30 is received", or the like. The energy storage system 30 may detect the timing, the surveillance apparatus 20 may detect the timing, or the determination apparatus 10 may detect the timing. In a case of obtaining the current position information from the position information obtaining unit included in the energy storage system 30, it is possible to transmit the regular installation position, the identification information, and the current position to the corresponding surveillance apparatus 20. These pieces of information may be transmitted at one time or separately.

Note that, orders of S31 and S32 are not limited to those illustrated.

After then, the surveillance apparatus 20 transmits the regular installation position of the energy storage system 30 (some pieces of the various registration information), the identification information of the energy storage system 30 (some pieces of the various registration information), and the current position information of the energy storage system 30 to the determination apparatus 10 (S33). These pieces of information may be transmitted at one time or separately. In a case where the operation permission is not received, these pieces of information are transmitted to the determination apparatus 10 together with the application for the operation permission.

After then, the determination apparatus 10 determines whether or not the energy storage system 30 is installed at the regular installation position on the basis of the current position information of the energy storage system 30 and the regular installation position obtained from the energy storage system 30 (S34). In a case where the current position information of the energy storage system 30 and the regular installation position obtained from the energy storage system 30 coincide with each other, the determination apparatus 10 can determine that the energy storage system 30 is installed at the regular installation position. Here, the coincidence may be an exact match, and furthermore, the coincidence may include a relationships (for example, a case where one is indicated with a wide range with town and the other is indicated with a narrower range by latitude and longitude or the like is assumed) in which one includes the other.

Further, the determination apparatus 10 may determine whether or not to permit the operation on the basis of the determination result (whether or not being installed at the regular installation position). In a case of being installed at the regular installation position, the determination apparatus 10 permits the operation and in a case of not being installed at the regular installation position, the determination apparatus 10 does not permit the operation.

After then, the determination apparatus 10 responds to the surveillance apparatus 20 with the determination result (S35). The surveillance apparatus 20 responds the energy storage system 30 with the determination result (S36). Note that, the response may include whether or not to permit the operation.

The energy storage system 30 controls the own system on the basis of the notified contents. That is, in a case where the response that the operation is permitted is received, the energy storage system 30 enters into the operable state. On the other hand, in a case where the response that the operation is not permitted is received, the energy storage system 30 enters into the inoperable state. In this case, the energy storage system 30 may notify that the operation is not permitted to the user. The notification unit is configured with the output device such as the display, the speaker, the mailer, the printer, and the like.

[Process Example in Case Where Operation is Permitted]

Figure 8:
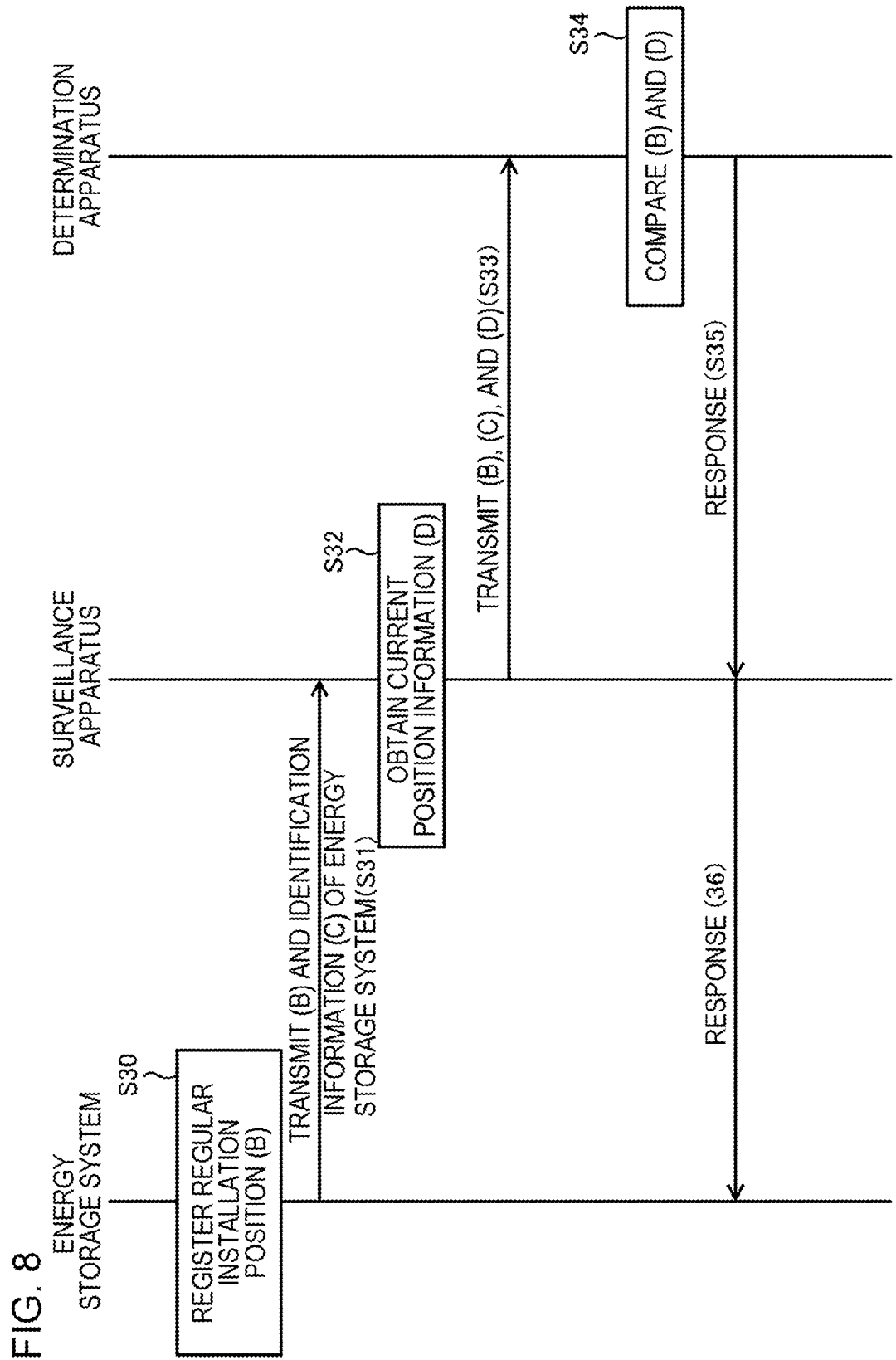
FIG. 8 is a sequence diagram illustrating still another example of a flow of a process of the surveillance system according to the present example embodiment.

In the case where the operation is permitted, S31 to S36 of FIG. 8 are repeated. That is, the energy storage system 30 transmits the various registration information to the corresponding surveillance apparatus 20 at the predetermined timing (S31). In addition, the surveillance apparatus 20 obtains the current position information of the energy storage system 30 at the predetermined timing (S32). For example, "timing when a predetermined date and time (for example, 0 o'clock on 1st every month) arrives", "timing when a power switch of the energy storage system 30 is turned ON", or the like is exemplified, but the timing is not limited thereto. Another variation will be described in the following example embodiment. The energy storage system 30 may detect the timing, the surveillance apparatus 20 may detect the timing, or the determination apparatus 10 may detect the timing.

Thereafter, the same process as described in "the process example in the case where the operation is not permitted" is repeated. Note that, in the case where the response that the operation is permitted is received (S36), the energy storage system 30 continues to operate as it is. On the other hand, in the case where the response that the operation is not permitted is received (S36), the energy storage system 30 stops operating. In this case, the energy storage system 30 may notify that the operation is not permitted to the user.

Next, a modification of the present example embodiment will be described.

In the present example embodiment, the determination apparatus 10 includes "a unit (the determination unit 13) which determines whether or not the energy storage system is installed at the regular installation position on the basis of the current position information of the energy storage system 30", but the surveillance apparatus 20 may include the unit. In a case of the modification, the surveillance apparatus 20 notifies the determination apparatus 10 of the determination result. The determination apparatus 10 manages a state (installation position and operation permission state) of the energy storage system 30 on the basis of the notified contents. The determination apparatus 10 may determine whether or not to permit the operation or the surveillance apparatus 20 may determine whether or not to permit the operation.

Next, an advantageous effect of the present example embodiment will be described.

According to the surveillance system of the present example embodiment, the determination apparatus 10 can determine whether or not each of the energy storage systems 30 is installed at the regular installation position on the basis of the information obtained from the surveillance apparatus 20 installed corresponding to each of the plural energy storage systems 30. According to the system, it is possible to verify whether or not the energy storage system is installed at the regular position without going to the place.

In addition, according to the surveillance system of the present example embodiment, the determination apparatus 10 can verify whether or not the energy storage system 30 is installed at the regular position at the predetermined timing ("timing when a power switch of the energy storage system 30 is turned ON", "timing when an instruction input for operating the energy storage system 30 is received", or the like) of before the start of the operation. For this reason, it is possible to suppress in advance inconvenience in which the energy storage system 30 which is not installed at the regular position is operated. As a result, it is possible to suppress in advance deterioration of a value of the energy storage system 30 and inconvenience in which the stolen energy storage system 30 is used.

In addition, according to the surveillance system of the present example embodiment, even after issuing the operation permission, the determination apparatus 10 can regularly and repeatedly determine whether or not the energy storage system 30 is installed at the regular position. In this case, "illegal act of moving to another position after being installed at the regular position and receiving the operation permission" or "illegal act of stealing the energy storage system 30 used at the regular location and using the energy storage system 30 in another place" is performed, it is possible to cancel the operation of the energy storage system 30. As a result, it is possible to suppress inconvenience in which such an energy storage system 30 described above is used.

In addition, according to the surveillance system of the present example embodiment, it is possible to identify the plural energy storage systems 30 by using the various registration information (the identification information and the regular installation position) registered in the energy storage system 30. For this reason, even in a case where the stolen energy storage system 30 is found in an unknown owner state, it is possible to determine a regular owner by using the registered various registration information.

In addition, according to the surveillance system of the present example embodiment, it is possible to determine whether or not the energy storage system 30 is installed at the regular installation position by using the various registration information (the identification information and the regular installation position) registered in the energy storage system 30. For this reason, in a case where the energy storage system 30 is replaced with another inexpensive energy storage system 30 not including the registration unit of the various registration information or the transmission unit to the surveillance apparatus 20, it is possible to detect this. As an example of replacement, for example, it is considered that the energy storage system 30 is replaced with the inexpensive energy storage system 30 so as to delay detection of theft. In addition, it is conceivable that one which receives financing for business using the energy storage system 30 uses another inexpensive energy storage system 30 instead of the energy storage system 30 indicated in a business plan.

Second Example Embodiment

Figure 9:
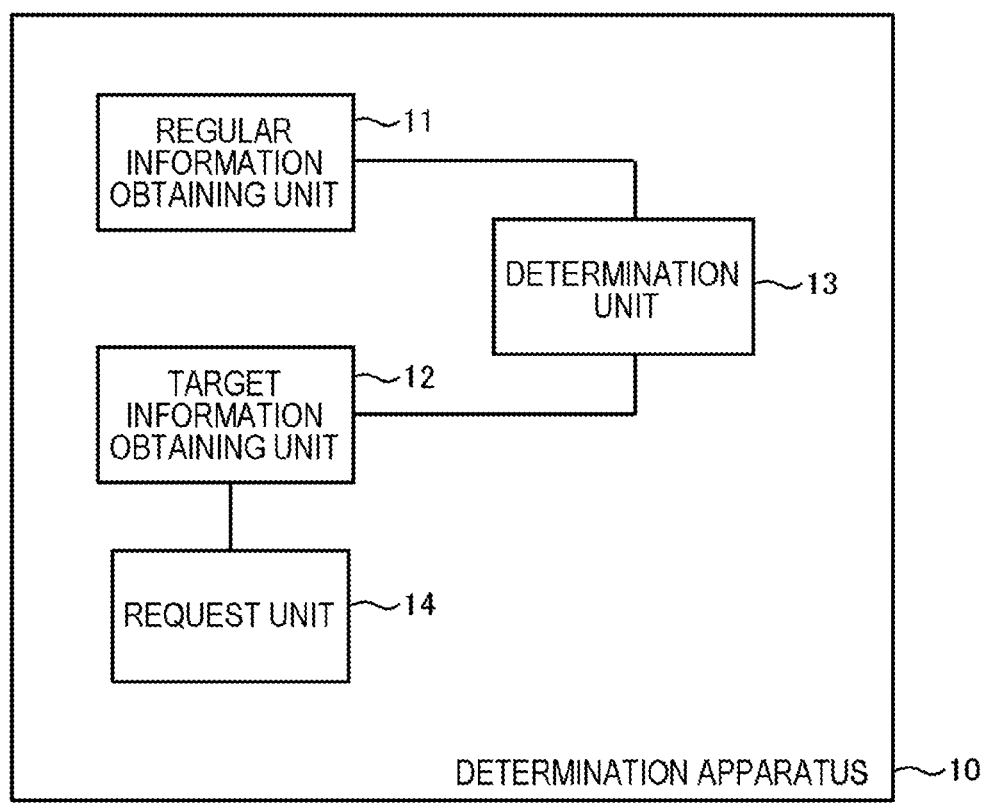
FIG. 9 is an example of a functional block diagram illustrating the determination apparatus according to the present example embodiment.

FIG. 9 illustrates an example of a functional block diagram of the determination apparatus 10 of the present example embodiment. As illustrated, the determination apparatus 10 includes the regular information obtaining unit 11, the target information obtaining unit 12, the determination unit 13, and a request unit 14.

The request unit 14 requests the various information (the various registration information, the current position information, and the like) to the surveillance apparatus 20. The regular information obtaining unit 11 and the target information obtaining unit 12 obtain the various information transmitted from the surveillance apparatus 20 in response to the request of the request unit 14. Other configurations of the regular information obtaining unit 11 and the target information obtaining unit 12 is the same configurations as the first example embodiment. In addition, the determination unit 13 have the same configuration as the first example embodiment.

Figure 10:
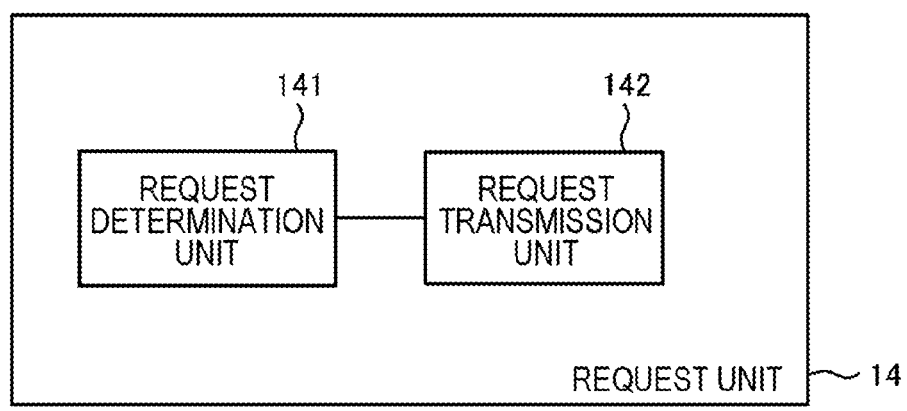
FIG. 10 is an example of a functional block diagram illustrating a request unit according to the present example embodiment.

FIG. 10 illustrates an example of a functional block diagram of the request unit 14. As illustrated, the request unit 14 includes a request determination unit 141 and a request transmission unit 142.

The request determination unit 141 determines to transmit the request to the surveillance apparatus 20 on the basis of a predetermined condition. The request transmission unit 142 transmits the request to the surveillance apparatus 20 according to the determination of the request determination unit 141. Hereinafter, some examples in which it is determined that the request is transmitted will be described.

Example 1

In Example 1, various sensors are attached to the surveillance apparatus 20 and/or the energy storage system 30. The request determination unit 141 obtains the sensor information of various sensors through a predetermined terminal installed on a consumer side. The request determination unit 141 determines to transmit the request to the surveillance apparatus 20 on the basis of the sensor information. The predetermined terminal may be the surveillance apparatus 20 or the energy storage system 30 or may be other.

Note that, various sensors are configured to include a power supply different from a power supply of the surveillance apparatus 20 or the energy storage system 30 and to continue sensing and transmission of the sensor information even in a case where a power switch of the surveillance apparatus 20 or the energy storage system 30 is turned OFF.

Example 1-1

In this example, the request determination unit 141 detects that the energy storage system 30 vibrates by a predetermined level or more on the basis of the sensor information obtained from a vibration sensor. The request determination unit 141 determines to transmit the request to the surveillance apparatus 20 according to the detection.

In a case of moving the energy storage system 30 to another place, it is considered that the energy storage system 30 vibrates by the predetermined level or more at various scenes (scene of taking away the system, scene of transit, scene of installing the system at another place, and the like). By verifying whether or not the installation position of the energy storage system 30 is regular according to the detection, it is possible to detect theft, illegal moving, or the like at an early stage.

Note that, during transit, it is assumed that the power switch of the surveillance apparatus 20 or the energy storage system 30 is turned OFF. In this case, the determination apparatus 10 cannot communicate with the surveillance apparatus 20 or the energy storage system 30. In a case of detecting the vibration by the predetermined level or more, the determination apparatus 10 may transmit the request at the timing when it becomes possible to communicate with the surveillance apparatus 20 thereafter.

Example 1-2

In this example, the request determination unit 141 detects that an opening and closing member included in the energy storage system 30 is opened on the basis of the sensor information. The request determination unit 141 determines to transmit the request to the surveillance apparatus 20 according to the detection.

The opening and closing member may be, for example, a member which partitions a space housing the parts of the energy storage system 30 from an external space. There is a possibility that the stolen energy storage system 30 is on a market or is used after an illegal remodeling (for example, replacing some components of the energy storage unit 34 or the like with inexpensive goods). When the illegal remodeling is made, the opening and closing member is opened. By verifying whether or not the installation position of the energy storage system 30 is regular according to the detection, it is possible to detect theft, illegal moving, or the like at an early stage.

Note that, during the remodeling, it is assumed that the power switch of the surveillance apparatus 20 or the energy storage system 30 is turned OFF. In this case, the determination apparatus 10 cannot communicate with the surveillance apparatus 20 or the energy storage system 30. When detecting that the opening and closing member is opened, the determination apparatus 10 may transmit the request at the timing when it becomes possible to communicate with the surveillance apparatus 20 thereafter.

Note that, the sensor which detects that the opening and closing member is opened is exemplified by a magnetic sensor and the like, but the sensor is not limited thereto.

Example 1-3

Figure 3:
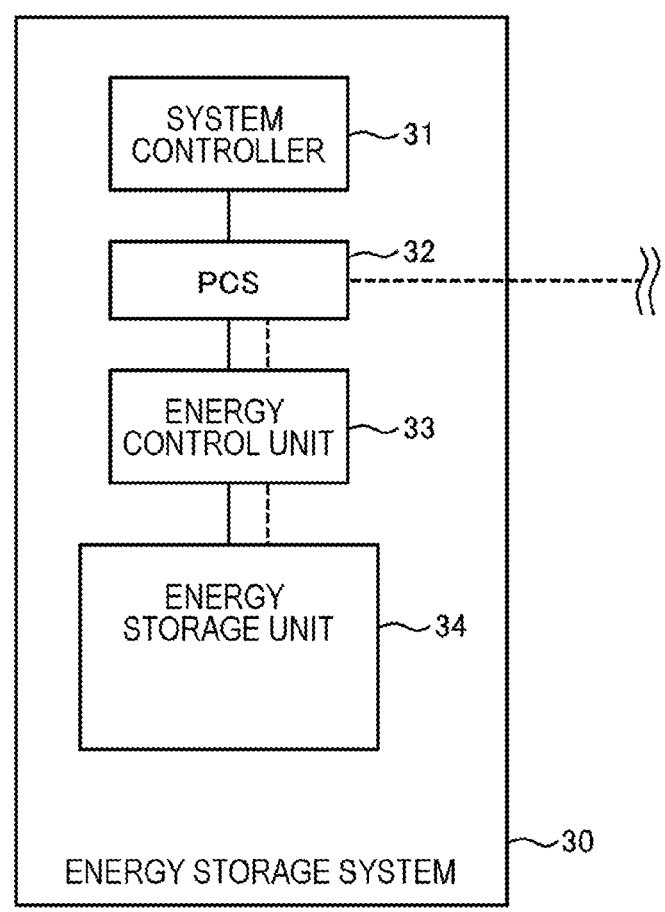
FIG. 3 is an example of a functional block diagram of an energy storage system according to the present example embodiment.

In this example, the request determination unit 141 detects that a connection state (for example, connection state of communication line or electric power line) of plural components (the system controller 31, the PCS 32, the energy control unit 33, the energy storage unit 34, and the like in FIG. 3) included in the energy storage system 30 is released on the basis of the sensor information. The request determination unit 141 determines to transmit the request to the surveillance apparatus 20 according to the detection.

There is a possibility that the stolen energy storage system 30 is on a market or is used after an illegal remodeling (for example, replacing some components of the energy storage unit 34 or the like with inexpensive goods). When the illegal remodeling is made, the connection states of the plural components are released. By verifying whether or not the installation position of the energy storage system 30 is regular according to the detection, it is possible to detect theft, illegal moving, or the like at an early stage.

Note that, during the remodeling, it is assumed that the power switch of the surveillance apparatus 20 or the energy storage system 30 is turned OFF. In this case, the determination apparatus 10 cannot communicate with the surveillance apparatus 20 or the energy storage system 30. In a case of detecting that the connection state of the component is released, the determination apparatus 10 may transmit the request at the timing when it becomes possible to communicate with the surveillance apparatus 20 thereafter.

Note that, the sensor which detects that the connection state of the plural components is released is exemplified by a magnetic sensor (for example, which detects that the plural components are at a distance of a predetermined level or more from each other) and the like, but the sensor is not limited thereto.

Example 1-4

In this example, the request determination unit 141 detects that the connection state (for example, connection state of communication line) of the energy storage system 30 and the surveillance apparatus 20 is released on the basis of the sensor information. The request determination unit 141 determines to transmit the request to the surveillance apparatus 20 according to the detection.

In a case where the surveillance apparatus 20 and the energy storage system 30 have a physically separated configuration and only the energy storage system 30 is moved, the connection state between the surveillance apparatus 20 and the energy storage system 30 is released. In addition, in some cases, even when both are moved, the connection state between the surveillance apparatus 20 and the energy storage system 30 is released so as to be separately moved in consideration of workability and the like. By verifying whether or not the installation position of the energy storage system 30 is regular according to the detection, it is possible to detect theft, illegal moving, or the like at an early stage.

Note that, during transit, it is assumed that the power switch of the surveillance apparatus 20 or the energy storage system 30 is turned OFF. In this case, the determination apparatus 10 cannot communicate with the surveillance apparatus 20 or the energy storage system 30. In a case of detecting that the connection state of the surveillance apparatus 20 and the energy storage system 30 is released, the determination apparatus 10 may transmit the request at the timing when it becomes possible to communicate with the surveillance apparatus 20 thereafter.

Note that, the sensor which detects that the connection state of the surveillance apparatus 20 and the energy storage system 30 is released is exemplified by a magnetic sensor (for example, which detects that the surveillance apparatus 20 and the energy storage system 30 are at a distance of a predetermined level or more from each other or detects that terminals (terminal of the communication line combining the surveillance apparatus 20 and the energy storage system 30 and the like) of the surveillance apparatus 20 and/or the energy storage system 30 and the communication line are at a distance of a predetermined level or more from each other), but the sensor is not limited thereto.

Example 1-5

In this example, the request determination unit 141 detects whether a measured value indicated by the sensor information and a reference value measured at the regular installation position registered corresponding to the energy storage system 30 are deviated from each other by a predetermined level or more. The request determination unit 141 determines to transmit the request to the surveillance apparatus 20 according to the detection. Environmental data such as air temperature and humidity can be considered as the measured value. The reference value may be a value published by a meteorological institute or the like or may be another value.

In a case where the measured value indicated by the sensor information and the reference value are deviated from each other by a predetermined level or more, there is a possibility that the energy storage system 30 is not installed at the regular installation position. By verifying whether or not the installation position of the energy storage system 30 is regular according to the detection, it is possible to detect that the energy storage system 30 is installed at a position different from the regular installation position at an early stage.

Example 2

In Example 2, a camera is attached to the surveillance apparatus 20 and/or the energy storage system 30. The request determination unit 141 obtains image data (image data of external environment) captured by the camera through a predetermined terminal installed on a consumer side. The request determination unit 141 determines to transmit the request to the surveillance apparatus 20 on the basis of the image data. The predetermined terminal may be the surveillance apparatus 20 or the energy storage system 30 or may be other.

For example, the camera may capture a still image at predetermined time intervals (for example, every day, every week, every ten days, every month) or may continuously image a movie. The request determination unit 141 analyzes the image data to detect that the energy storage system 30 is moved. The request determination unit 141 determines to transmit the request to the surveillance apparatus 20 according to the detection.

For example, in a case where a difference between an image of a frame imaged in the past and an image of a latest frame is equal to or higher than a predetermined level, the request determination unit 141 may determine that the energy storage system 30 is moved.

By verifying whether or not the installation position of the energy storage system 30 is regular according to the detection, it is possible to detect theft, illegal moving, or the like at an early stage.

Example 3

In Example 3, according to the detection of a predetermined date and time (for example, 0 o'clock every day, 0 o'clock on Mondays, 0 o'clock on 1st every month, or the like) being reached, the request determination unit 141 determines to transmit the request to the surveillance apparatus 20. Note that, the request determination unit 141 may transmit the request to the surveillance apparatus 20 corresponding to the energy storage system 30 having the operation permission at the timing.

By regularly verifying whether or not the installation position of the energy storage system 30 is regular, it is possible to detect theft, illegal moving, or the like at an early stage.

Example 4

In Example 4, the request determination unit 141 obtains a value of a current state of charge (SOC) of the energy storage system 30 from the energy storage system 30 through the surveillance apparatus 20. According to detection that the SOC becomes a predetermined value (a value included in a predetermined numerical range), the request determination unit 141 determines to transmit the request to the surveillance apparatus 20.

In a case of moving the energy storage system 30, it is considered that the SOC of the energy storage system 30 is adjusted within a safe numerical range suitable for the moving. The safe numerical range suitable for the moving varies depending on the configuration of the energy storage system 30, a manufacturer, a type of a material of a storage battery, a model number of a product, and the like.

By verifying whether or not the installation position of the energy storage system 30 is regular according to the detection, it is possible to detect theft, illegal moving, or the like at an early stage.

Example 5

In Example 5, the request determination unit 141 obtains a response time of the energy storage system 30 in response to an instruction from the determination apparatus 10. In a case where the response time changes from a previous value, the request determination unit 141 determines to transmit the request to the surveillance apparatus 20. The instruction may be transmitted from the determination apparatus 10 to the energy storage system 30 through the surveillance apparatus 20 and response data may be transmitted from the energy storage system 30 to the determination apparatus 10 through the surveillance apparatus 20.

Although contents of the instruction are not particularly limited thereto, the contents may be, for example, a charge and discharge instruction with a charge and discharge pattern in which a charge power value [W] or a discharge power value [W] is determined along a time axis. In this case, the response data is actual measurement data of a charge power [W] or a discharge power [W] of the energy storage system 30. For example, a measurement sensor included in the energy storage system 30 measures the actual measurement data. Then, the actual measurement data is transmitted to the request determination unit 141. The response time is, for example, a time from an instruction transmitting timing to a timing when the charge and discharge pattern is measured.

There is a possibility that the stolen energy storage system 30 is on a market or is used after an illegal remodeling (for example, replacing some components of the energy storage unit 34 or the like with inexpensive goods). By performing the illegal remodeling, there is a possibility that a performance of the energy storage system 30 is changed and the response time is changed from a previous one. By verifying whether or not the installation position of the energy storage system 30 is regular according to the detection, it is possible to detect theft, illegal moving, or the like at an early stage.

Example 6

In Example 6, the request determination unit 141 obtains an elapsed time of a standby state in which the energy storage system 30 does not perform a storage operation (for example, charge operation) and a discharge operation (for example, discharge operation) of energy from the surveillance apparatus 20. The request determination unit 141 determines to transmit the request to the surveillance apparatus 20 according to detection that the elapsed time exceeds a predetermined value.

During transit, there is a high possibility that the energy storage system 30 is in the standby state in which the energy storage operation and the energy discharge operation are not performed. In a case where the standby state exceeds a predetermined value, there is a high possibility that the energy storage system 30 is in the moving. By verifying whether or not the installation position of the energy storage system 30 is regular according to the detection, it is possible to detect theft, illegal moving, or the like at an early stage.

Example 7

In Example 7, the request determination unit 141 obtains a frequency of power of charging and discharging performed by the energy storage system 30 from the energy storage system 30 through the surveillance apparatus 20. The request determination unit 141 determines to transmit the request to the surveillance apparatus 20 according to the detection of the change from a previous frequency. In Japan, frequencies of commercial power supplies between western Japan and eastern Japan are different from each other. By verifying whether or not the installation position of the energy storage system 30 is regular according to the detection, it is possible to detect a case of the energy storage system being moved across western Japan and eastern Japan by theft, illegal moving, or the like at an early stage.

Example 8

In Example 8 the request determination unit 141 obtains a charge power amount of the energy storage system 30 installed so as to charge generated power of a power generator which generates electric power with natural energy (for example, sunlight, wind power, geothermy, and the like) from the energy storage system 30 through the surveillance apparatus 20. In addition, the request determination unit 141 obtains a generated power amount of the power generator estimated from a weather condition in the regular installation position of the energy storage system 30. A method of obtaining the weather condition and a means which predicts the generated power of the power generator from the weather condition are not particularly limited, and any technology can be adopted.

The request determination unit 141 determines to transmit the request to the surveillance apparatus 20 according to the detection of a contradiction between the charge power amount of the energy storage system 30 and the estimated value.

Which state is detected as the contradiction described above is depended on a design, but an example will be described. For example, according to the weather condition, it is considered that the generated power amount [Wh] equal to or larger than a predetermined value is predicted in a predetermined time slot during daytime, whereas charging is not performed at all in the time slot. In such a state, there is a possibility that an installation environment in which the power generator is installed in the energy storage system 30 is changed. That is, there is a possibility that the energy storage system 30 is moved. Note that, in a case where such a state occurs at a ratio equal to or higher than a predetermined level (for example, five days or more per week), the case may be detected as contradiction.

By verifying whether or not the installation position of the energy storage system 30 is regular according to the detection, it is possible to detect theft, illegal moving, or the like at an early stage.

Example 9

In Example 9, the request determination unit 141 obtains information indicating a time slot when the energy storage system 30 performs the energy storage operation (for example, charge operation) and a time slot when the energy storage system 30 performs the energy discharge operation (for example, discharge operation) from the energy storage system 30 through the surveillance apparatus 20. The request determination unit 141 determines to transmit the request to the surveillance apparatus 20 according to detection that the tendency thereof is changed from a previous tendency.

For example, in some cases, the energy storage system 30 performs the storage operation at night with a low energy unit price and performs the discharge operation in daytime with a high energy unit price. The tendency of the operation mentioned above appears conspicuously for the energy storage system 30 (energy storage system 30 with no power generator installed) which is not installed so as to charge the generated power of the power generator. In contrast, for the energy storage system 30 (energy storage system 30 with power generator installed) which is installed so as to charge the generated power of the power generator, in some cases, the generated power of the power generator is charged during daytime. In this way, according to a difference whether or not the power generator is installed, tendencies between the time slot when the energy storage operation is performed and the time slot when the energy discharge operation is performed varies from each other.

In a case where the trend is changed from a previous trend, there is a possibility that "whether or not the power generator is installed" is changed. There is a possibility that the energy storage system 30 is moved.

By verifying whether or not the installation position of the energy storage system 30 is regular according to the detection (for example, detection of change in presence/absence of daytime charge), it is possible to detect theft, illegal moving, or the like at an early stage.

Note that, the power storage system is sometimes sold as a set with photovoltaics (PV), and in this case, there is a possibility that the power storage system is purchased at a lower price than sold separately. Therefore, by detecting that the storage system which is sold as the set with the PV, that is, which should charge energy during daytime, performs the charge and discharge operation without PV, night charge and daytime discharge, it is possible to recognize that the power storage system is illegally disconnected from the PV and is moved.

Example 10

In Example 10, the request determination unit 141 obtains at least one of a storage amount, a discharge amount, an integrated amount [Wh] (including not only a continuously integrated amount but also an integration when charging is switched to discharging on the way) related to charging or discharging, an integrated time related to charging or discharging, and the number of times of cycles related to charging and discharging of energy of the energy storage system 30 from the energy storage system 30 through the surveillance apparatus 20. As an example, it is considered to obtain an integrated amount in a case where a storage operation or a discharge operation is continuously performed for a predetermined time (for example, 10 minutes or 1 hour). The request determination unit 141 determines to transmit the request to the surveillance apparatus 20 according to the detection of the change from a previous value by a predetermined level or more.

There is a possibility that the stolen energy storage system 30 is on a market or is used after an illegal remodeling (for example, replacing some components of the energy storage unit 34 or the like with inexpensive goods). By performing the illegal remodeling, there is a possibility that a performance of the energy storage system 30 is changed and the obtained value is changed from a previous one. For example, there is a possibility that a speed of the energy discharge operation (for example, discharge speed) and a speed of the energy storage operation (for example, charge speed) are changed from a previous one. By verifying whether or not the installation position of the energy storage system 30 is regular according to the detection, it is possible to detect theft, illegal moving, or the like at an early stage.

Note that, the surveillance apparatus 20 and the energy storage system 30 have the same configuration as the first example embodiment.

According to the present example embodiment described above, the same advantageous effect as the first example embodiment can be realized. In addition, according to the present example embodiment, by verifying whether or not the installation position of the energy storage system 30 is regular, it is possible to detect theft, illegal moving, or the like at an early stage.

Third Example Embodiment

Figure 11:
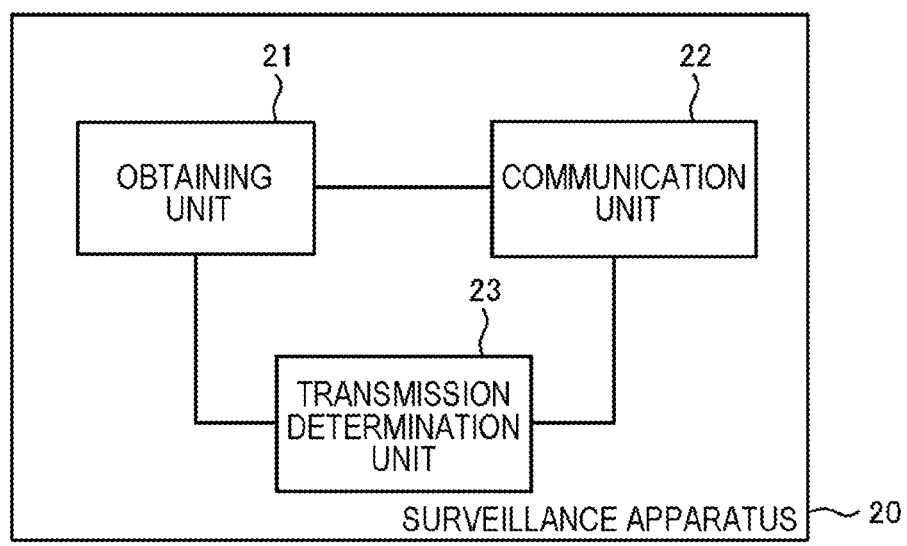
FIG. 11 is an example of a functional block diagram illustrating the surveillance apparatus according to the present example embodiment.

FIG. 11 illustrates an example of a functional block diagram of the surveillance apparatus 20 of the present example embodiment. As illustrated, the surveillance apparatus 20 includes an obtaining unit 21, a communication unit 22, and a transmission determination unit 23.

The transmission determination unit 23 determines to transmit the current position information of the energy storage system 30 or other information (the identification information, the regular installation position, and the like) to the external apparatus (determination apparatus 10) on the basis of a predetermined condition.

The transmission determination unit 23 determines to transmit the information to the external apparatus in the same manner as the request determination unit 141 described in the second example embodiment. That is, the transmission determination unit 23 obtains the same data (for example, data described in Example 1 to Example 10) as that of the request determination unit 141 described in the second example embodiment, performs the same determination (for example, determination described in Example 1 to Example 10) as that of the request determination unit 141, and determines to transmit the current position information of the energy storage system 30 or other information (the identification information, the regular installation position, and the like) to the external apparatus (determination apparatus 10) at the same timing as "timing determined to transmit the request to the surveillance apparatus 20 by the request determination unit 141 (for example, timing described in Example 1 to Example 10)".

The obtaining unit 21 requests the various registration information to the corresponding energy storage system 30 and obtains the various registration information according to the determination made by the transmission determination unit 23. In addition, the obtaining unit 21 obtains current position information of the corresponding energy storage system 30 according to the determination. The communication unit 22 transmits the above-described information obtained by the obtaining unit 21 to the determination apparatus 10. Other configurations of the obtaining unit 21 and the communication unit 22 is the same configurations as the first example embodiment.

Note that, as a modification of the present example embodiment, instead of the surveillance apparatus 20, the energy storage system 30 may include the transmission determination unit 23. If the transmission determination unit 23 determines to transmit the current position information of the energy storage system 30 or other information (the identification information, the regular installation position, and the like) to the external apparatus (determination apparatus 10), the energy storage system 30 may transmit the various registration information to the surveillance apparatus 20. In addition, the energy storage system 30 may further transmit the current position information to the surveillance apparatus 20.

According to the present example embodiment described above, the same advantageous effect as the first example embodiment can be realized, in addition, according to the present example embodiment, by verifying whether or not the installation position of the energy storage system 30 is regular, it is possible to detect theft, illegal moving, or the like at an early stage.

Hereinafter, appendixes to examples of reference forms will be added.

1. A determination apparatus including:
a target information obtaining unit that obtains current position information of an energy storage system;
a position information obtaining unit that obtains installation position associated with each energy storage system; and a determination unit that determines whether or not the energy storage system is installed at the installation position on the basis of the current position information of the energy storage system.

2. The determination apparatus according to appendix 1, in which the position information obtaining unit obtains the installation position of the energy storage system from a regular information storage unit that stores the installation position associated with each of the plural energy storage systems and the energy storage system that stores the installation position of the own system, and the determination unit determines whether or not the energy storage system is installed at the installation position on the basis of the current position information, the installation position obtained from the regular information storage unit, and the installation position obtained from the energy storage system.

3. The determination apparatus according to appendix 1 or 2, further including:

a request unit that requests the current position information of the energy storage system to a surveillance apparatus that surveils the energy storage system, in which the target information obtaining unit obtains the current position information of the energy storage system transmitted from the surveillance apparatus in response to the request.

4. The determination apparatus according to appendix 3, in which the request unit includes a request determination unit that determines to transmit the request to the surveillance apparatus on the basis of a predetermined condition, and a request transmission unit that transmits the request to the surveillance apparatus according to determination of the request determination unit.

5. The determination apparatus according to appendix 4, in which the request determination unit determines to transmit the request to the surveillance apparatus on the basis of sensor information obtained from a sensor attached to the energy storage system and/or the surveillance apparatus.

6. The determination apparatus according to appendix 5, in which the request determination unit detects that the energy storage system vibrates by a predetermined level or more on the basis of the sensor information and determines to transmit the request to the surveillance apparatus according to the detection.

7. The determination apparatus according to appendix 5, in which the request determination unit detects that an opening and closing member included in the energy storage system is opened on the basis of the sensor information and determines to transmit the request to the surveillance apparatus according to the detection.

8. The determination apparatus according to appendix 5, in which the request determination unit detects that a connection state of plural components included in the energy storage system is released on the basis of the sensor information and determines to transmit the request to the surveillance apparatus according to the detection.

9. The determination apparatus according to appendix 5, in which the request determination unit detects that a connection state of the energy storage system and the surveillance apparatus is released on the basis of the sensor information and determines to transmit the request to the surveillance apparatus according to the detection.

10. The determination apparatus according to appendix 5, in which the request determination unit detects that a measured value indicated by the sensor information and a reference value measured at the installation position are deviated from each other by a predetermined level or more and determines to transmit the request to the surveillance apparatus according to the detection.

11. The determination apparatus according to appendix 4, in which the request determination unit determines to transmit the request to the surveillance apparatus on the basis of image data obtained from a camera attached to the energy storage system and/or the surveillance apparatus that surveils the energy storage system.

12. The determination apparatus according to appendix 4, in which the request determination unit determines to transmit the request to the surveillance apparatus according to detection of a predetermined date and time being reached.

13. The determination apparatus according to appendix 4, in which the request determination unit determines to transmit the request to the surveillance apparatus according to detection of a state of charge (SOC), of the energy storage system, becoming a predetermined value.

14. The determination apparatus according to appendix 4, in which the request determination unit determines to transmit the request to the surveillance apparatus according to detection of a response time, of the energy storage system responding to an instruction from the determination apparatus, being changed from a previous response time by a predetermined level or more.

15. The determination apparatus according to appendix 4, in which the request determination unit determines to transmit the request to the surveillance apparatus according to detection of an elapsed time, of a standby state in which the energy storage system does not perform an energy storage operation or an energy discharge operation, exceeding a predetermined value.

16. The determination apparatus according to appendix 4, in which the request determination unit determines to transmit the request to the surveillance apparatus according to detection of a frequency, of power of charging and discharging performed by the energy storage system, being changed from a previous frequency.

17. The determination apparatus according to appendix 4, in which the request determination unit determines to transmit the request to the surveillance apparatus according to detection of a contradiction between a charge power amount of the energy storage system installed to charge generated power of a power generator which generates power with natural energy and a generated power amount of the power generator estimated from a weather condition at the installation position.

18. The determination apparatus according to appendix 4, in which the request determination unit determines to transmit the request to the surveillance apparatus according to detection of a tendency, of a time slot when the energy storage system performs an energy storage operation and a time slot when the energy storage system performs an energy discharge operation, being changed from a previous tendency.

19. The determination apparatus according to appendix 4, in which the request determination unit determines to transmit the request to the surveillance apparatus according to detection of a storage amount and/or a discharge amount, of energy of the energy storage system, being changed from a previous value by a predetermined level or more.

20. A surveillance apparatus including:

a transmission determination unit that determines to transmit current position information of an energy storage system to an external apparatus on the basis of a predetermined condition; and a communication unit that transmits the current position information of the energy storage system to the external apparatus according to determination of the transmission determination unit.

21. The surveillance apparatus according to appendix 20, in which the transmission determination unit determines to transmit the current position information to the external apparatus on the basis of sensor information obtained from a sensor attached to the energy storage system and/or the surveillance apparatus that surveils the energy storage system.

22. The surveillance apparatus according to appendix 21, in which the transmission determination unit detects that the energy storage system vibrates by a predetermined level or more on the basis of the sensor information and determines to transmit the current position information to the external apparatus according to the detection.

23. The surveillance apparatus according to appendix 21, in which the transmission determination unit detects that an opening and closing member included in the energy storage system is opened on the basis of the sensor information and determines to transmit the current position information to the external apparatus according to the detection.

24. The surveillance apparatus according to appendix 21, in which the transmission determination unit detects that a connection state of plural components included in the energy storage system is released on the basis of the sensor information and determines to transmit the current position information to the external apparatus according to the detection.

25. The surveillance apparatus according to appendix 21, in which the transmission determination unit detects that a connection state of the energy storage system and the surveillance apparatus is released on the basis of the sensor information and determines to transmit the current position information to the external apparatus according to the detection.

26. The surveillance apparatus according to appendix 21, in which the transmission determination unit detects that a measured value indicated by the sensor information and a reference value measured at an installation position associated with each energy storage system are deviated from each other by a predetermined level or more and determines to transmit the current position information to the external apparatus according to the detection.

27. The surveillance apparatus according to appendix 20, in which the transmission determination unit determines to transmit the current position information to the external apparatus on the basis of image data obtained from a camera attached to the energy storage system and/or the surveillance apparatus that surveils the energy storage system.

28. The surveillance apparatus according to appendix 20, in which the transmission determination unit determines to transmit the current position information to the external apparatus according to detection of a predetermined date and time being reached.

29. The surveillance apparatus according to appendix 20, in which the transmission determination unit determines to transmit the current position information to the external apparatus according to detection of a state of charge (SOC), of the energy storage system, becoming a predetermined value.

30. The surveillance apparatus according to appendix 20, in which the transmission determination unit determines to transmit the current position information to the external apparatus according to detection of a response time, of the energy storage system responding to an instruction from the surveillance apparatus, being changed from a previous response time by a predetermined level or more.

31. The surveillance apparatus according to appendix 20, in which the transmission determination unit determines to transmit the current position information to the external apparatus according to detection of an elapsed time, of a standby state in which the energy storage system does not perform an energy storage operation or an energy discharge operation, exceeding a predetermined value.

32. The surveillance apparatus according to appendix 20, in which the transmission determination unit determines to transmit the current position information to the external apparatus according to detection of a frequency, of power of charging and discharging performed by the energy storage system, being changed from a previous frequency.

33. The surveillance apparatus according to appendix 20, in which the transmission determination unit determines to transmit the current position information to the external apparatus according to detection of a contradiction between a charge power amount of the energy storage system installed to charge generated power of a power generator which generates power with natural energy and a generated power amount of the power generator estimated from a weather condition at the installation position associated with each energy storage system.

34. The surveillance apparatus according to appendix 20, in which the transmission determination unit determines to transmit the current position information to the external apparatus according to detection of a tendency, of a time slot when the energy storage system performs an energy storage operation and a time slot when the energy storage system performs an energy discharge operation, being changed from a previous tendency.

35. The surveillance apparatus according to appendix 20, in which the transmission determination unit determines to transmit the current position information to the external apparatus according to detection of a storage amount and/or a discharge amount of energy of the energy storage system being changed from a previous value by a predetermined level or more.

36. A surveillance system including:
the determination apparatus according to any one of appendixes 1 to 19, and
the surveillance apparatus according to any one of appendixes 20 to 35.

37. The surveillance system according to appendix 36, further including an energy storage system.

38. A determination method executed by a computer, the method including:
a target information obtaining step of obtaining current position information of an energy storage system;
a position information obtaining step of obtaining installation position associated with each energy storage system; and
a determination step of determining whether or not the energy storage system is installed at the installation position on the basis of the current position information of the energy storage system.

39. A program causing a computer to function as:
a target information obtaining unit that obtains current position information of an energy storage system;
a position information obtaining unit that obtains installation position associated with each energy storage system; and a determination unit that determines whether or not the energy storage system is installed at the installation position on the basis of the current position information of the energy storage system.

40. A surveillance method executed by a computer, the method including:
a transmission determination step of determining to transmit current position information of an energy storage system to an external apparatus on the basis of a predetermined condition; and
a communication step of transmitting the current position information of the energy storage system to the external apparatus according to determination in the transmission determination step.

41. A program causing a computer to function as:
a transmission determination unit that determines to transmit current position information of an energy storage system to an external apparatus on the basis of a predetermined condition; and
a communication unit that transmits the current position information of the energy storage system to the external apparatus according to determination of the transmission determination unit.

This application claims priority based on Japanese Patent Application No. 2016-140566 filed on Jul. 15, 2016, the disclosure of which is incorporated herein in its entirety.

The invention claimed is:

1. A determination apparatus comprising:
a target information obtaining unit that obtains current position information of an energy storage system;
a position information obtaining unit that obtains an installation position associated with the energy storage system, the installation position being registered in advance by a user having legitimate authority; and
a determination unit that determines whether or not the energy storage system is installed at the installation position on the basis of the current position information of the energy storage system.

2. The determination apparatus according to claim 1,
wherein the position information obtaining unit obtains the installation position of the energy storage system from a regular information storage unit that stores the installation position associated with each of a plurality of the energy storage systems and the energy storage system that stores the installation position of the own system, and
the determination unit determines whether or not the energy storage system is installed at the installation position on the basis of the current position information, the installation position obtained from the regular information storage unit, and the installation position obtained from the energy storage system.

3. The determination apparatus according to claim 1, further comprising:
a request unit that requests the current position information of the energy storage system to a surveillance apparatus that surveils the energy storage system,
wherein the target information obtaining unit obtains the current position information of the energy storage system transmitted from the surveillance apparatus in response to the request.

4. The determination apparatus according to claim 3,
wherein the request unit includes a request determination unit that determines to transmit the request to the surveillance apparatus on the basis of a predetermined condition, and
a request transmission unit that transmits the request to the surveillance apparatus according to determination of the request determination unit.

5. The determination apparatus according to claim 4,
wherein the request determination unit determines to transmit the request to the surveillance apparatus on the basis of sensor information obtained from a sensor attached to the energy storage system and/or the surveillance apparatus.

6. The determination apparatus according to claim 5,
wherein the request determination unit detects that the energy storage system vibrates by a predetermined level or more on the basis of the sensor information and determines to transmit the request to the surveillance apparatus according to the detection.

7. The determination apparatus according to claim 5,
wherein the request determination unit detects that an opening and closing member included in the energy storage system is opened on the basis of the sensor information and determines to transmit the request to the surveillance apparatus according to the detection.

8. The determination apparatus according to claim 5,
wherein the request determination unit detects that a connection state of a plurality of components included in the energy storage system is released on the basis of the sensor information and determines to transmit the request to the surveillance apparatus according to the detection.

9. The determination apparatus according to claim 5,
wherein the request determination unit detects that a connection state of the energy storage system and the surveillance apparatus is released on the basis of the sensor information and determines to transmit the request to the surveillance apparatus according to the detection.

10. The determination apparatus according to claim 5,
wherein the request determination unit detects that a measured value indicated by the sensor information and a reference value measured at the installation position are deviated from each other by a predetermined level or more and determines to transmit the request to the surveillance apparatus according to the detection.

11. The determination apparatus according to claim 4,
wherein the request determination unit determines to transmit the request to the surveillance apparatus on the basis of image data obtained from a camera attached to the energy storage system and/or the surveillance apparatus that surveils the energy storage system.

12. The determination apparatus according to claim 4,
wherein the request determination unit determines to transmit the request to the surveillance apparatus according to detection of a predetermined date and time being reached.

13. The determination apparatus according to claim 4,
wherein the request determination unit determines to transmit the request to the surveillance apparatus according to detection of a state of charge (SOC) of the energy storage system becoming a predetermined value.

14. The determination apparatus according to claim 4,
wherein the request determination unit determines to transmit the request to the surveillance apparatus according to detection of a response time of the energy storage system responding to an instruction from the determination apparatus being changed from a previous response time by a predetermined level or more.

15. The determination apparatus according to claim 4, wherein the request determination unit determines to transmit the request to the surveillance apparatus according to detection of an elapsed time of a standby state in which the energy storage system does not perform an energy storage operation or an energy discharge operation exceeding a predetermined value.

16. The determination apparatus according to claim 4, wherein the request determination unit determines to transmit the request to the surveillance apparatus according to detection of a frequency of power of charging and discharging performed by the energy storage system being changed from a previous frequency.

17. The determination apparatus according to claim 4, wherein the request determination unit determines to transmit the request to the surveillance apparatus according to detection of a contradiction between a charge power amount of the energy storage system installed to charge generated power of a power generator which generates power with natural energy and a generated power amount of the power generator estimated from a weather condition at the installation position.

18. The determination apparatus according to claim 4, wherein the request determination unit determines to transmit the request to the surveillance apparatus according to detection of a tendency of a time slot when the energy storage system performs an energy storage operation and a time slot when the energy storage system performs an energy discharge operation being changed from a previous tendency.

19. The determination apparatus according to claim 4, wherein the request determination unit determines to transmit the request to the surveillance apparatus according to detection of an integrated storage amount and/or an integrated discharge amount of energy of the energy storage system within a predetermined time being changed from a previous value by a predetermined level or more.

20. A surveillance apparatus comprising:
a position information obtaining unit that obtains an installation position associated with an energy storage system, the installation position being registered in advance by a user having legitimate authority;
a transmission determination unit that determines to transmit current position information and the installation position of the energy storage system to an external apparatus on the basis of a predetermined condition; and
a communication unit that transmits the current position information and the installation position of the energy storage system to the external apparatus according to determination of the transmission determination unit.

21. The surveillance apparatus according to claim 20, wherein the transmission determination unit determines to transmit the current position information to the external apparatus on the basis of sensor information obtained from a sensor attached to the energy storage system and/or the surveillance apparatus that surveils the energy storage system.

22. The surveillance apparatus according to claim 21, wherein the transmission determination unit detects that the energy storage system vibrates by a predetermined level or more on the basis of the sensor information and determines to transmit the current position information to the external apparatus according to the detection.

23. The surveillance apparatus according to claim 21, wherein the transmission determination unit detects that an opening and closing member included in the energy storage system is opened on the basis of the sensor information and determines to transmit the current position information to the external apparatus according to the detection.

24. The surveillance apparatus according to claim 21, wherein the transmission determination unit detects that a connection state of a plurality of components included in the energy storage system is released on the basis of the sensor information and determines to transmit the current position information to the external apparatus according to the detection.

25. The surveillance apparatus according to claim 21, wherein the transmission determination unit detects that a connection state of the energy storage system and the surveillance apparatus is released on the basis of the sensor information and determines to transmit the current position information to the external apparatus according to the detection.

26. The surveillance apparatus according to claim 21, wherein the transmission determination unit detects that a measured value indicated by the sensor information and a reference value measured at the installation position associated with each energy storage system are deviated from each other by a predetermined level or more and determines to transmit the current position information to the external apparatus according to the detection.

27. The surveillance apparatus according to claim 20, wherein the transmission determination unit determines to transmit the current position information to the external apparatus on the basis of image data obtained from a camera attached to the energy storage system and/or the surveillance apparatus that surveils the energy storage system.

28. The surveillance apparatus according to claim 20, wherein the transmission determination unit determines to transmit the current position information to the external apparatus according to detection of a predetermined date and time being reached.

29. The surveillance apparatus according to claim 20, wherein the transmission determination unit determines to transmit the current position information to the external apparatus according to detection of a state of charge (SOC) of the energy storage system becoming a predetermined value.

30. The surveillance apparatus according to claim 20, wherein the transmission determination unit determines to transmit the current position information to the external apparatus according to detection of a response time of the energy storage system responding to an instruction from the surveillance apparatus being changed from a previous response time by a predetermined level or more.

31. The surveillance apparatus according to claim 20, wherein the transmission determination unit determines to transmit the current position information to the external apparatus according to detection of an elapsed time of a standby state in which the energy storage system does not perform an energy storage operation or an energy discharge operation exceeding a predetermined value.

32. The surveillance apparatus according to claim 20, wherein the transmission determination unit determines to transmit the current position information to the external apparatus according to detection of a frequency of power of charging and discharging performed by the energy storage system being changed from a previous frequency.

33. The surveillance apparatus according to claim 20, wherein the transmission determination unit determines to transmit the current position information to the external apparatus according to detection of a contradiction between a charge power amount of the energy storage system installed to charge generated power of a power generator which generates power with natural energy and a generated power amount of the power generator estimated from a weather condition at the installation position associated with each energy storage system.

34. The surveillance apparatus according to claim 20, wherein the transmission determination unit determines to transmit the current position information to the external apparatus according to detection of a tendency of a time slot when the energy storage system performs an energy storage operation and a time slot when the energy storage system performs an energy discharge operation being changed from a previous tendency.

35. The surveillance apparatus according to claim 20, wherein the transmission determination unit determines to transmit the current position information to the external apparatus according to detection of an integrated storage amount and/or an integrated discharge amount of energy of the energy storage system within a predetermined time being changed from a previous value by a predetermined level or more.

36. A surveillance system comprising:
the determination apparatus according to claim 1, and a surveillance apparatus comprising:
a position information obtaining unit that obtains an installation position associated with an energy storage system, the installation position being registered in advance by a user having legitimate authority;
a transmission determination unit that determines to transmit current position information and the installation position of the energy storage system to an external apparatus on the basis of a predetermined condition; and
a communication unit that transmits the current position information and the installation position of the energy storage system to the external apparatus according to determination of the transmission determination unit.

37. The surveillance system according to claim 36, further comprising the energy storage system.

38. A determination method executed by a computer, the method comprising:
a target information obtaining step of obtaining current position information of an energy storage system;
a position information obtaining step of obtaining an installation position associated with the energy storage system, the installation position being registered in advance by a user having legitimate authority; and
a determination step of determining whether or not the energy storage system is installed at the installation position on the basis of the current position information of the energy storage system.

39. A non-transitory storage medium storing a program causing a computer to function as:
a target information obtaining unit that obtains current position information of an energy storage system;
a position information obtaining unit that obtains an installation position associated with the energy storage system, the installation position being registered in advance by a user having legitimate authority; and
a determination unit that determines whether or not the energy storage system is installed at the installation position on the basis of the current position information of the energy storage system.

40. A surveillance method executed by a computer, the method comprising:
a position information obtaining step of obtaining an installation position associated with an energy storage system, the installation position being registered in advance by a user having legitimate authority;
a transmission determination step of determining to transmit current position information and the installation position of the energy storage system to an external apparatus on the basis of a predetermined condition; and
a communication step of transmitting the current position information and the installation position of the energy storage system to the external apparatus according to determination in the transmission determination step.

41. A non-transitory storage medium storing a program causing a computer to function as:
a position information obtaining unit that obtains an installation position associated with an energy storage system, the installation position being registered in advance by a user having legitimate authority;
a transmission determination unit that determines to transmit current position information and the installation position of the energy storage system to an external apparatus on the basis of a predetermined condition; and
a communication unit that transmits the current position information and the installation position of the energy storage system to the external apparatus according to determination of the transmission.

* * * * *